US 7,578,742 B2

(12) United States Patent
Miyamoto et al.

(10) Patent No.: US 7,578,742 B2
(45) Date of Patent: Aug. 25, 2009

(54) RECORDING MEDIUM STORING VIDEO GAME PROGRAM AND VIDEO GAME DEVICE

(75) Inventors: Shigeru Miyamoto, Kyoto (JP); Hirohito Yoshimoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 879 days.

(21) Appl. No.: 11/086,202

(22) Filed: Mar. 23, 2005

(65) Prior Publication Data
US 2005/0215323 A1 Sep. 29, 2005

(30) Foreign Application Priority Data
Mar. 26, 2004 (JP) ............................. 2004-092476

(51) Int. Cl.
*A63F 13/00* (2006.01)

(52) U.S. Cl. ............................. 463/37; 463/32; 345/173

(58) Field of Classification Search ........................ None
See application file for complete search history.

(56) References Cited

U.S. PATENT DOCUMENTS

| 4,302,011 | A |   | 11/1981 | Pepper, Jr. |            |
|-----------|---|---|---------|-------------|------------|
| 4,305,131 | A | * | 12/1981 | Best        | ... 715/716 |
| 4,353,552 | A |   | 10/1982 | Pepper, Jr. |            |
| 4,542,903 | A | * | 9/1985  | Yokoi et al. | ... 463/31 |
| 4,672,541 | A | * | 6/1987  | Bromley et al. | ... 463/31 |
| 5,214,414 | A | * | 5/1993  | Levine et al. | ... 345/157 |
| 5,356,156 | A | * | 10/1994 | Suzuki et al. | ... 463/31 |
| 5,393,073 | A | * | 2/1995  | Best        | ... 463/35 |
| 5,649,861 | A | * | 7/1997  | Okano et al. | ... 463/30 |
| 5,717,432 | A |   | 2/1998  | Miwa et al. |            |
| 5,777,605 | A |   | 7/1998  | Yoshinobu et al. |        |
| 5,807,174 | A | * | 9/1998  | Fukuhara et al. | ... 463/31 |
| 5,880,709 | A | * | 3/1999  | Itai et al. | ... 345/629 |
| 6,093,105 | A | * | 7/2000  | Morihira    | ... 463/38 |
| 6,135,884 | A |   | 10/2000 | Hedrick et al. |         |
| 6,229,529 | B1 |  | 5/2001  | Yano et al. |            |

(Continued)

FOREIGN PATENT DOCUMENTS

JP 5-31256 2/1993

(Continued)

OTHER PUBLICATIONS

Y. Akutsu, "[column] Game Chotokkyu 105 A latest edition of a masterpiece golf political game [Links 2003 Japanese-language version ]" [online] 2003.5.16, Maicomi Journal, (C) Mainichi Communications Inc., [searched on Oct. 8, 2008], Internet <URL:http://journal.mycom.co.jp/column/game/105/index.html>, 6 pages, together with English translation.

*Primary Examiner*—M. Sager
(74) *Attorney, Agent, or Firm*—Nixon & Vanderhye P.C.

(57) ABSTRACT

The player gives a change in the input through a touch operation to a character pattern P2 displayed on a second display screen 12*a* covered by a touch panel. The character pattern P2 is associated with a player character P1 displayed on a first display screen 11*a*, and is displayed on a larger scale than the player character P1. The player character P1 is moved according to the change in the input. Thus, a video game is provided that is played on a dual-screen video game device with a novel operation in which the player can accurately specify an intended position.

11 Claims, 22 Drawing Sheets

U.S. PATENT DOCUMENTS

| | | |
|---|---|---|
| 6,261,179 B1 * | 7/2001 | Miyamoto et al. ............ 463/23 |
| 6,270,413 B1 * | 8/2001 | Aikawa et al. ................ 463/31 |
| 6,296,570 B1 * | 10/2001 | Miyamoto et al. ............ 463/30 |
| 6,509,845 B1 | 1/2003 | Tanaka |
| 6,594,023 B1 | 7/2003 | Omura et al. |
| 6,840,859 B2 | 1/2005 | Cannon et al. |
| 6,942,571 B1 | 9/2005 | McAllister et al. |
| 6,966,837 B1 * | 11/2005 | Best ............................ 463/33 |
| 7,309,287 B2 * | 12/2007 | Miyamoto et al. ............ 463/37 |
| 7,371,163 B1 * | 5/2008 | Best .............................. 463/1 |
| 2005/0176486 A1 * | 8/2005 | Nishimura et al. ............. 463/4 |

FOREIGN PATENT DOCUMENTS

| | | |
|---|---|---|
| JP | 6-44001 | 2/1994 |
| JP | 6-285259 | 10/1994 |
| JP | 7-182092 | 7/1995 |
| JP | 2535301 | 6/1996 |
| JP | 2001-5438 A | 1/2001 |
| JP | 2003-290552 | 10/2003 |

* cited by examiner

RECORDING MEDIUM STORING VIDEO GAME PROGRAM AND VIDEO GAME DEVICE

BACKGROUND

1. Field of the Technology

The technology presented herein relates to a recording medium storing a video game program and a video game device. More particularly, the technology relates to a recording medium storing a video game program to be executed on a computer of a video game device having a first display screen and a second display screen covered by a touch panel in which a game image is changed according to a change in the input to the second display screen, and to such a video game device.

2. Description of the Background Art

With a conventional video game device, the game space is displayed as a game image on a television set, or the like. A controller having a plurality of control keys is connected to the video game device, whereby the player can control a character in the game space. The video game device detects the output signal from the controller to determine which control key is being activated by the player, and changes the game image by changing the character image according to the action associated with the activated control key.

However, the physical shapes and arrangement of the control keys on the controller are fixed, and it is not possible with such a conventional video game device to provide control keys that are optimal for each particular game. In view of this, there have been video game devices using, instead of a controller, a display device provided with a touch panel or a tablet.

A video game device disclosed in Japanese Patent No. 2535301 displays images of control keys on a touch panel as required for each video game program, as shown in FIG. 3 thereof. Depending on which control key image is touched and selected, a function associated with the activated control key image is executed in the game.

In a video game device disclosed in Japanese Laid-Open Patent Publication No. 6-285259, graphic patterns and/or letters related to the game image displayed on a television set are displayed on a display device with a touch panel provided on the controller, as shown in FIG. 3 to FIG. 8 thereof. When a graphic pattern or a letter is touched and selected with a finger, a function associated with the activated graphic pattern or letter is executed in the game.

In a video game device disclosed in Japanese Laid-Open Patent Publication No. 7-182092, a game image is displayed on a display device provided with a touch panel, as shown in FIG. 6 thereof. When the player touches a displayed object on the touch panel with a finger and moves the finger on the touch panel, the touched and selected object is moved in the game image according to the vector quantity of the movement of the player's finger.

In a video game device disclosed in Japanese Laid-Open Patent Publication No. 5-31256, a tablet and a flat display are layered together into a single component, and a golf course is depicted on the flat display as a game image, as shown in FIG. 2 thereof. A virtual ball flight is simulated with the shot direction being the direction of the series of coordinate positions corresponding to the trace of a pen left on the tablet by the player and the shot power being the interval between adjacent coordinate positions in the series of coordinate positions.

However, the video game device disclosed in Japanese Patent No. 2535301 and that disclosed in Japanese Laid-Open Patent Publication No. 6-285259 only determine whether or not a graphic pattern, or the like, displayed on the display device under the touch panel of the controller is selected so as to accordingly execute a function associated with the activated graphic pattern in the game image. In other words, they use control keys displayed on a display device under a touch panel, instead of using physical control keys, and only provide a limited advantage that control keys can be freely provided in any shape and arrangement according to the type of the game.

With the video game device disclosed in Japanese Laid-Open Patent Publication No. 7-182092 and that disclosed in Japanese Laid-Open Patent Publication No. 5-31256 aim at allowing the player to move an image laid over a touch panel or a tablet to an intended position in the game image. However, when an object to be moved is small, it is difficult for the player to accurately specify an intended move. Moreover, an object such as the player character to be moved in the game image by the player using a touch panel or a tablet may be hid from the player by the player's hand, thus detracting from the play ability of certain types of games in which the player can otherwise enjoy watching the movement of the player character.

Other types of devices, such as personal digital assistance (PDA) devices, also employ a touch panel, whereby the user can directly operate a graphic pattern displayed on a liquid crystal display device covered by the touch panel. Specifically, with a PDA, or the like, the user can "double-click" a graphic pattern such as a folder to open the folder or "drag" a graphic pattern such as an icon to move the icon. Thus, in a PDA, or the like, where it is important to reliably execute an operation intended by the user, the appearance of a graphic pattern that is directly touched by the user is changed. However, such a technique, if simply applied to an electronic game, will change the appearance of a player character that can be directly operated by the player, whereby the player may lose track of the player character. For example, assume that a number of triangular and circular control key graphic patterns are displayed on a display unit covered by a touch panel. If the player touches and activates one of the circular control keys and that circular control key is turned into a triangular control key as a result of the player's operation, the player is likely to lose track of the control key, which was circular before the player's operation.

SUMMARY

Therefore, a feature of an example embodiment presented herein is to provide a recording medium storing a video game program and a video game device, in which a graphic pattern is displayed on a second display screen covered by a touch panel, and the player can accurately make an input to the graphic pattern by using the touch panel, and in which a game image displayed on a first display screen is changed according to the player's input while maintaining the operability.

The example embodiment has the following features to attain the above. Note that parenthetic expressions in the following section (reference numerals, step numbers each including "S" followed by a number, supplementary explanations, etc.) are merely to indicate the correlation between what is described in the following section and what is described in the description of the preferred embodiments set out further below in the present specification, and are in no way intended to restrict the scope of the example embodiments.

A video game program stored on a recording medium of the example embodiment presented herein is executed by a computer (21, etc.) of a video game device (1) including a first display screen (11a) and a second display screen (12a) covered by a touch panel (13). The video game program makes the computer to function as first game image display control means (S21, S51), second game image display control means (S22, S52), input detection means (S23, S27, S28, S53, S57, S58), change condition calculation means (S24, S26, S29, S31, S54, S56, S59, S61) and player character control means (S32, S62). The first game image display control means displays, on the first display screen, a first game image including a player character (P1) to be operated by a player. The second game image display control means displays a second game image on the second display screen in which a character pattern (P2) corresponding to the player character in the first game image is displayed on a larger scale than the player character in the first game image. The input detection means detects an input position (input coordinate position) and an input change (e.g., a series of input coordinate positions) specified through a touch operation on the touch panel. The change condition calculation means is means for, when at least a portion of the input position detected by the input detection means (i.e., the coordinate positions of the start point, the end point, and some or all of the intermediate points) is on the character pattern displayed on the second display screen, calculating change condition data (e.g., the movement direction, the velocity or the shot mode) used for changing an appearance of the player character (e.g., movement thereof) according to the input position on the character pattern and the input change detected by the input detection means. The player character control means changes the appearance of the player character based on the change condition data.

In a preferred embodiment, the change condition calculation means divides a detection region (P3) of the touch panel corresponding to the character pattern displayed on the second display screen into a plurality of defined regions (Z1 to Z4), and calculates an action parameter (shot mode) as the change condition data (S84), wherein the action parameter is calculated based on which defined region includes the input position on the character pattern.

In a preferred embodiment, the player character is a moving object that moves in a game space. Then, the change condition calculation means calculates, as the change condition data, initial movement condition data (the movement steps gStepX and gStepY, the velocity gSpeed) and movement transition condition data (flags for setting the shot mode, the curve coefficient k). The change condition calculation means calculates the initial movement condition data used for determining an initial movement direction of the moving object in the game space based on a direction of the input change (S86, S87, S89). The change condition calculation means calculates the movement transition condition data used for changing a movement direction of the moving object in the game space after the movement of the moving object in the initial movement direction has been started, based on the input position on the character pattern (S84, S91, S155).

In a preferred embodiment, the input change detection means determines whether or not there is an input to the touch panel at regular intervals, and detects the input position and the input change by detecting coordinate positions on the touch panel while the input is being detected continuously. The change condition calculation means extracts coordinate positions at an input start point and an input end point from the input to the touch panel continuously detected by the input change detection means, and calculates the change condition data according to the coordinate positions at the input start point and the input end point.

In a preferred embodiment, the player character is a moving object that moves in a game space. Then, the change condition calculation means calculates initial movement condition data and movement transition condition data as the change condition data. The change condition calculation means calculates the initial movement condition data used for determining an initial movement direction and a velocity of the moving object in the game space, based on a direction from the coordinate position at the input start point (the start point S) to the coordinate position at the input end point (the end point E). The change condition calculation means divides a detection region of the touch panel corresponding to the character pattern displayed on the second display screen into a plurality of defined regions, and calculates the movement transition condition data used for changing a movement direction of the moving object in the game space after the movement of the moving object in the initial movement direction has been started, wherein the movement transition condition data is calculated based on which defined region includes at least one of the coordinate positions on the character pattern at the input start point and the input endpoint.

In a preferred embodiment, the change condition calculation means divides the detection region of the touch panel corresponding to the character pattern displayed on the second display screen into a plurality of defined regions according to a direction from the coordinate position at the input start point to the coordinate position at the input end point (FIG. 8, S101 to S105, S107, S109 to S111, S113).

In a preferred embodiment, the change condition calculation means calculates the movement transition condition data so that an amount by which a movement direction of the moving object is changed is larger as a distance between a predetermined reference position (the center of P2) and a straight line (SE) including the coordinate position at the input start point and the coordinate position at the input end point is larger, the predetermined reference position being included in the detection region of the touch panel corresponding to the character pattern displayed on the second display screen (S91).

In a preferred embodiment, the input change detection means determines whether or not there is an input to the touch panel at regular intervals, and detects the input position and the input change by detecting coordinate positions on the touch panel while the input is being detected continuously. The video game program recorded on the recording medium makes the computer to further function as timer means for clocking an input detection time being an amount of time for which an input is continuously detected by the input change detection means (S30, S60). The change condition calculation means extracts coordinate positions at an input start point and an input end point from the input to the touch panel continuously detected by the input change detection means, and calculates the change condition data according to at least two of the coordinate position at the input start point, the coordinate position at the input end point and the input detection time.

In a preferred embodiment, the input change detection means determines whether or not there is an input to the touch panel at regular intervals, and detects the input position and the input change by detecting coordinate positions on the touch panel while the input is being detected continuously. The video game program recorded on the recording medium makes the computer to further function as shape producing means for, while an input is continuously detected by the input change detection means, producing a single shape (the isosceles triangle Tr, a line, an arrow, etc.) representing a relationship between a current input coordinate position (the point N) on the touch panel and the coordinate position at the input start point (S73, S74). The second game image display control means displays, on the second display screen, the second game image further including the shape produced by the shape producing means (FIG. 7).

In a preferred embodiment, the shape produced by the shape producing means is an isosceles triangle (Tr) in which the current input coordinate position is an apex, and the coordinate position at the input start point is at a midpoint along a base having a predetermined length (2L).

A video game device of the example embodiment presented herein includes storage means (22), a first display screen, a second display screen covered by a touch panel, and a game execution means (21, etc.). The storage means stores the video game program recorded on the recording medium as described above. The game execution means executes the video game program stored in the storage means.

With the video game program recorded on the recording medium of the example embodiment, the appearance of the player character on the first display screen is changed according to a change in the input to the touch panel given to the character pattern, whereby it is possible to provide a video game with a novel operation. Since the character pattern corresponding to the player character is displayed on the second display screen on a larger scale than the player character, the player can relatively accurately specify an intended position. Since the player operates the character pattern displayed on the second display screen while the player character whose appearance changes is separately displayed on the first display screen, it is possible to prevent the player character from being hid from the player by the player's hand performing a touch operation. Since the appearance of the player character on the first display screen is changed according to a relatively accurate input position and a relatively accurate change in the input to the character pattern while the appearance of the character pattern displayed on the second display screen is not changed, it is possible to visualize a change in the appearance intended by the player on the first display screen while preventing the player from losing track of the graphic pattern to be operated by the player, and the player can easily identify the player character on the first display screen as being an object to be operated by the player.

Where the change condition calculation means calculates the change condition data by using a plurality of defined regions (Z1 to Z4), it is possible to increase the variety of patterns in which the appearance of the player character is changed, thus enhancing the game playability. Generally, if the character pattern to be operated through a touch operation is divided into smaller regions for that reason, each region to be operated through a touch operation may become too small for the player to perform an intended operation. In the present invention, however, the character pattern is displayed on the second display screen on a larger scale than the player character, whereby even if the character pattern is divided into smaller regions, the player can relatively accurately specify an intended position.

Where the player character is a moving object that moves in the game space and the change condition calculation means calculates the initial movement condition data and the movement transition condition data as the change condition data, it is possible to increase the variety of patterns in which the appearance of the player character is changed, thus enhancing the game playability.

Where the change condition calculation means calculates the change condition data according to the coordinate positions at the input start point and the input end point, the player's intuitive operation can be reflected in the change in the appearance of the player character.

Where the movement transition condition data is calculated based on which defined region includes the coordinate position at the input start point or the input end point, how the player character is moved is determined based on the relationship between the coordinate position at the input start point or the input end point and the defined region of the character pattern, whereby the player's intuitive operation can be reflected in the movement of the player character in the first display screen.

Where the character pattern is divided into a plurality of defined regions according to the direction from the coordinate position at the input start point to the coordinate position at the input end point, the character pattern is divided in such a manner that the change in the appearance of the player character can be predicted based on the direction in which the player character is initially moved, whereby the player can intuitively predict the change in the appearance of the player character from the player's touch operation.

Where the movement transition condition data is calculated so that the amount by which the movement direction of the moving object is changed is larger as the distance between a predetermined reference position and the straight line including the coordinate positions at the input start point and the input end point is larger, it is possible to further increase the variety of patterns in which the appearance of the player character is changed, thus enhancing the game playability. Moreover, the player can intuitively understand the increase in the amount of change.

Where the computer further functions as timer means, the amount of time for which an input is continuously made is reflected in how the appearance is changed, the player's intuitive operation can be more reflected in the change in the appearance of the player character on the first display screen.

Where a shape representing the relationship between the current input coordinate position and the coordinate position at the input start point is displayed on the second display screen, it is possible to continuously show the player the current status of the input to the touch panel.

Where the shape is an isosceles triangle in which the current input coordinate position is the apex and the coordinate position at the input start point is at the midpoint along the base having a predetermined length, it is possible to simultaneously show the direction and the distance between the start point of the touch operation and the current input position.

The video game device of the example embodiment presented herein provides similar effects to those of the recording medium storing the video game program as described above.

These and other features, aspects and advantages of the example embodiment will become more apparent from the following detailed description when taken in conjunction with the accompanying drawings.

DESCRIPTION OF THE PREFERRED EMBODIMENTS

First Embodiment

A portable video game device including a computer for executing a video game program according to a first embodiment will now be described. While the present embodiment is directed to a case where the appearance of the player character included in the game image is changed, the appearance of the entire game image may alternatively be changed. A video game device of the present embodiment is a portable video game device including physically separate two display screens, one of which is covered by a touch panel. Alternatively, the video game device may be a home-console type video game device, an arcade video game device, a portable terminal device, a mobile telephone or a personal computer, for example. The video game device of the present invention may alternatively be a video game device including a single display screen that is divided by software into two screens, at least one of which is covered by a touch panel.

Figure 1:
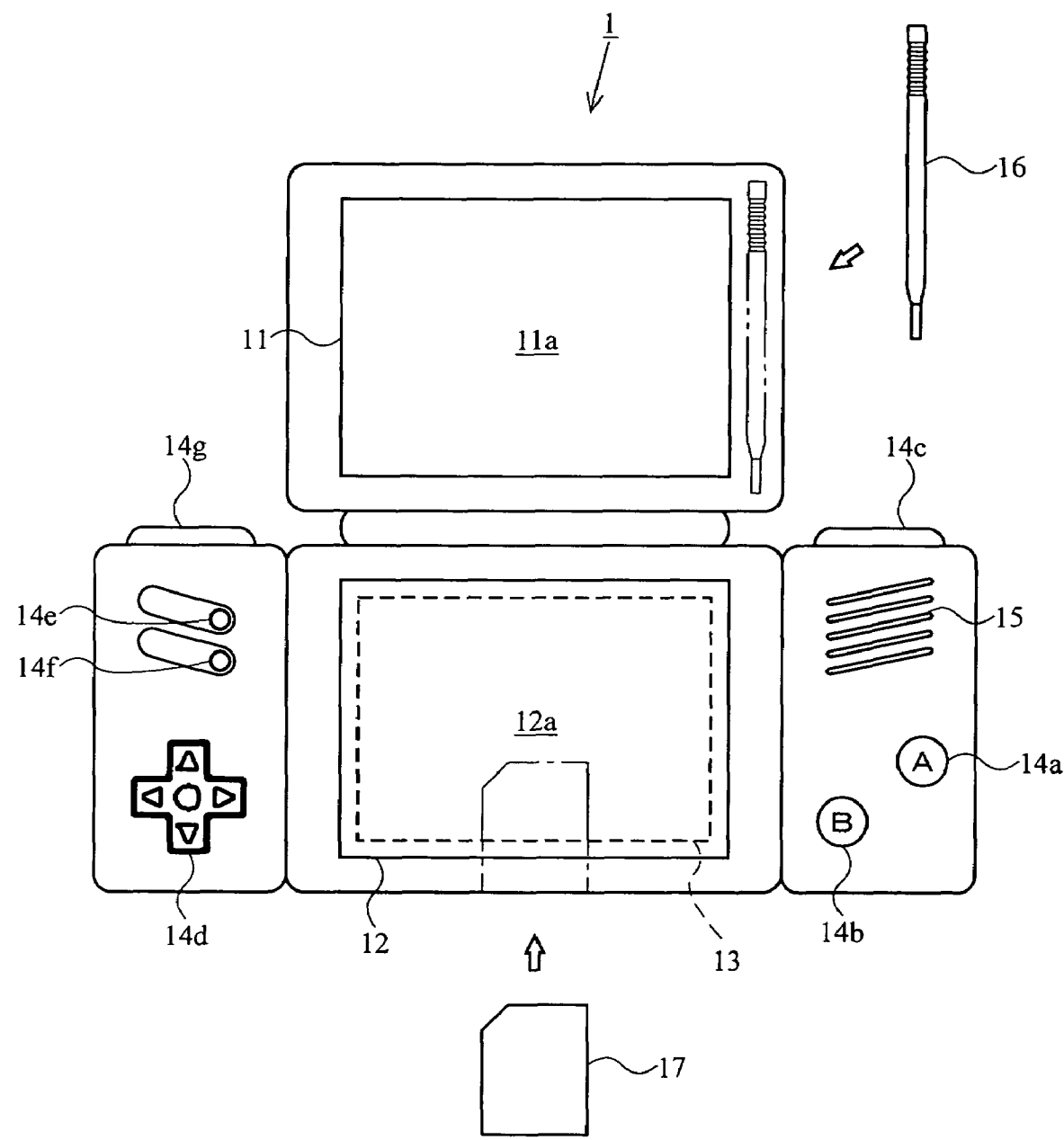
FIG. 1 generally shows a video game device 1 according to first and second embodiments.

FIG. 1 generally shows a portable video game device 1 of the first embodiment. Referring to FIG. 1, the portable video game device 1 (hereinafter referred to simply as "the video game device 1") includes a first liquid crystal display device 11 (hereinafter a liquid crystal display device will be referred to as an "LCD") having the first display screen 11a, and a second LCD 12 having the second display screen 12a. The surface of the second display screen 12a is covered by the touch panel 13. Provided on the right-hand side of the second display screen 12a are an A button 14a, a B button 14b and an R switch 14c, which can be operated by the right hand of the player, and a speaker 15 for outputting game music and sound. Provided on the left-hand side of the second display screen 12a are a cross-shaped control pad 14d, a start button 14e, a select button 14f and an L switch 14g, which can be operated by the left hand of the player. The A button 14a, the B button 14b, the R switch 14c, the cross-shaped control pad 14d, the start button 14e, the select button 14f and the L switch 14g will be collectively referred to as a control key 14.

The video game device 1 also includes a stylus 16 for making an input to the touch panel 13, and the stylus 16 is detachably accommodated in the video game device 1. A game cartridge 17 storing a video game program of the present invention (hereinafter referred to simply as "the cartridge 17") is detachably attached to the video game device 1. While it is effective to use the stylus 16 where the touch panel 13 has a high detection resolution, an input to the touch panel 13 may also be made by a finger of the player, for example, without using the stylus 16 where the touch panel 13 has a low detection resolution. The touch panel 13 may be any of various types of touch-sensitive panels, including a resistive film touch panel, an optical touch panel, an ultrasonic touch panel, a capacitance touch panel, an electromagnetic touch panel, etc. Particularly, a resistive film touch panel is inexpensive and advantageous. The detection method may be either a matrix method (digital) or a resistance detecting method (analog) depending on the configuration thereof.

Figure 2:
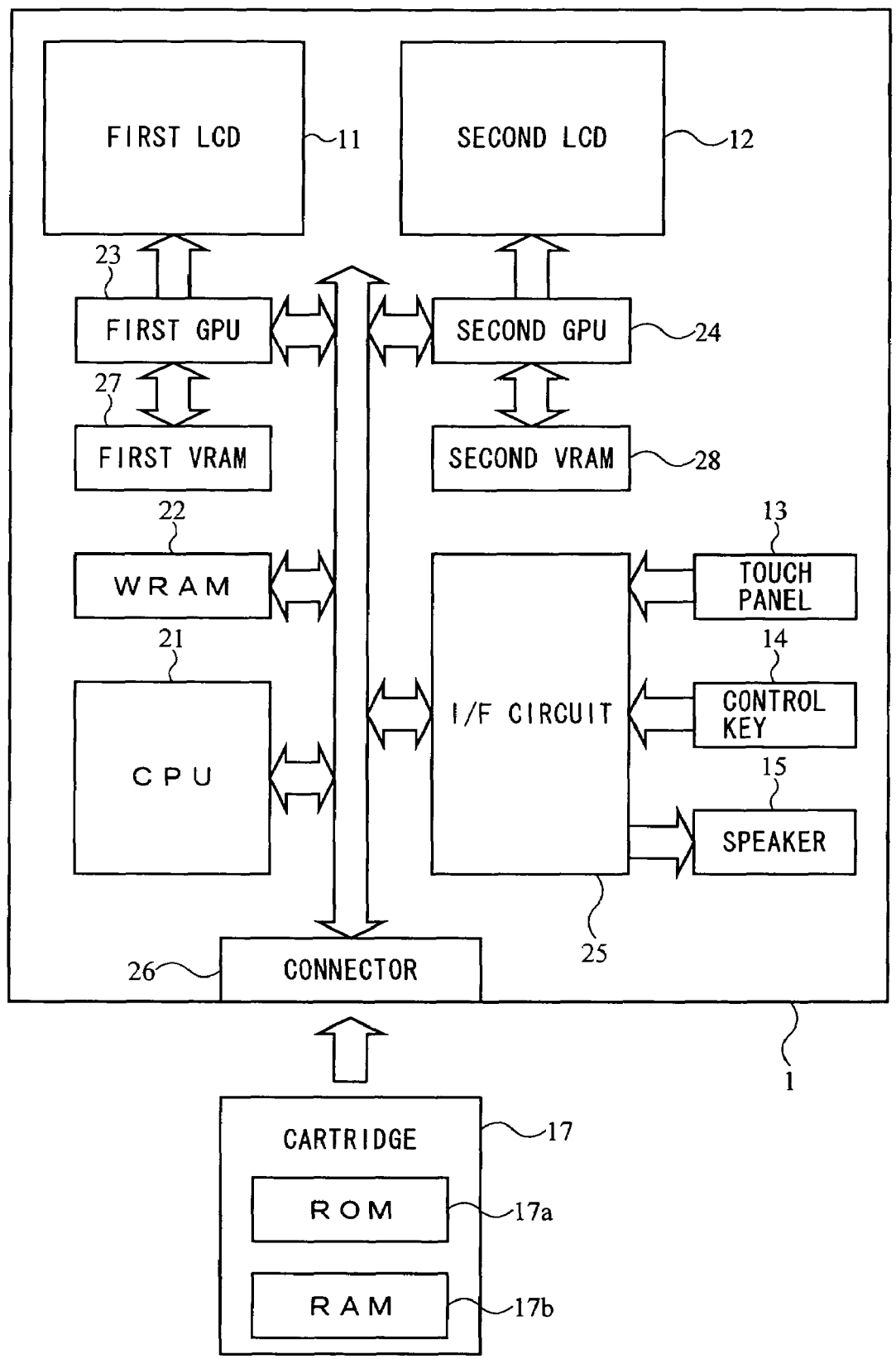
FIG. 2 is a block diagram showing a configuration of the video game device 1 of FIG. 1.

FIG. 2 is a block diagram showing a configuration of the video game device 1. Referring to FIG. 2, the video game device 1 includes a CPU 21 being an example of a computer for executing a video game program. A WRAM (work memory device) 22, a first GPU (graphics processing unit) 23, a second GPU 24 and an I/F (interface) circuit 25 are electrically connected to the CPU (central processing unit) 21 via a predetermined bus. The WRAM 22 is a primary memory for storing the video game program to be executed by the CPU 21 and the results of a calculation performed by the CPU 21. The first GPU 23 renders, in a first VRAM (video RAM) 27, a first game image to be displayed on the first LCD 11 in response to an instruction from the CPU 21, and the rendered first game image is displayed on the first display screen 11a of the first LCD 11. The second GPU 24 renders, in a second VRAM 28, a second game image (graphic pattern) to be displayed on the second LCD 12 in response to an instruction from the CPU 21, and the rendered second game image is displayed on the second display screen 12a. The I/F circuit 25 is a circuit for exchanging data between the CPU 21 and external input/output devices such as the touch panel 13, the control key 14 and the speaker 15.

The touch panel 13 (including a touch panel device driver) has a coordinate system corresponding to that of the second VRAM 28 for outputting data of a coordinate position corresponding to a position that is input (specified) by the stylus 16 or a finger of the player. It is assumed in the present embodiment that the resolution of the display screen is 192 dots×256 dots and the detection resolution of the touch panel 13 is also 192 dots×256 dots. The detection resolution of the touch panel 13 may be lower than the resolution of the display screen.

A connector 26 is also electrically connected to the CPU 21, and the cartridge 17 is detachably connected to the connector 26. The cartridge 17 is a storage medium for storing a video game program. More specifically, the cartridge 17 includes a ROM 17a for storing a video game program, and a RAM 17b for rewritably storing backup data. The video game program stored in the ROM 17a of the cartridge 17 is loaded to the WRAM 22, and executed by the CPU 21.

Figure 3:
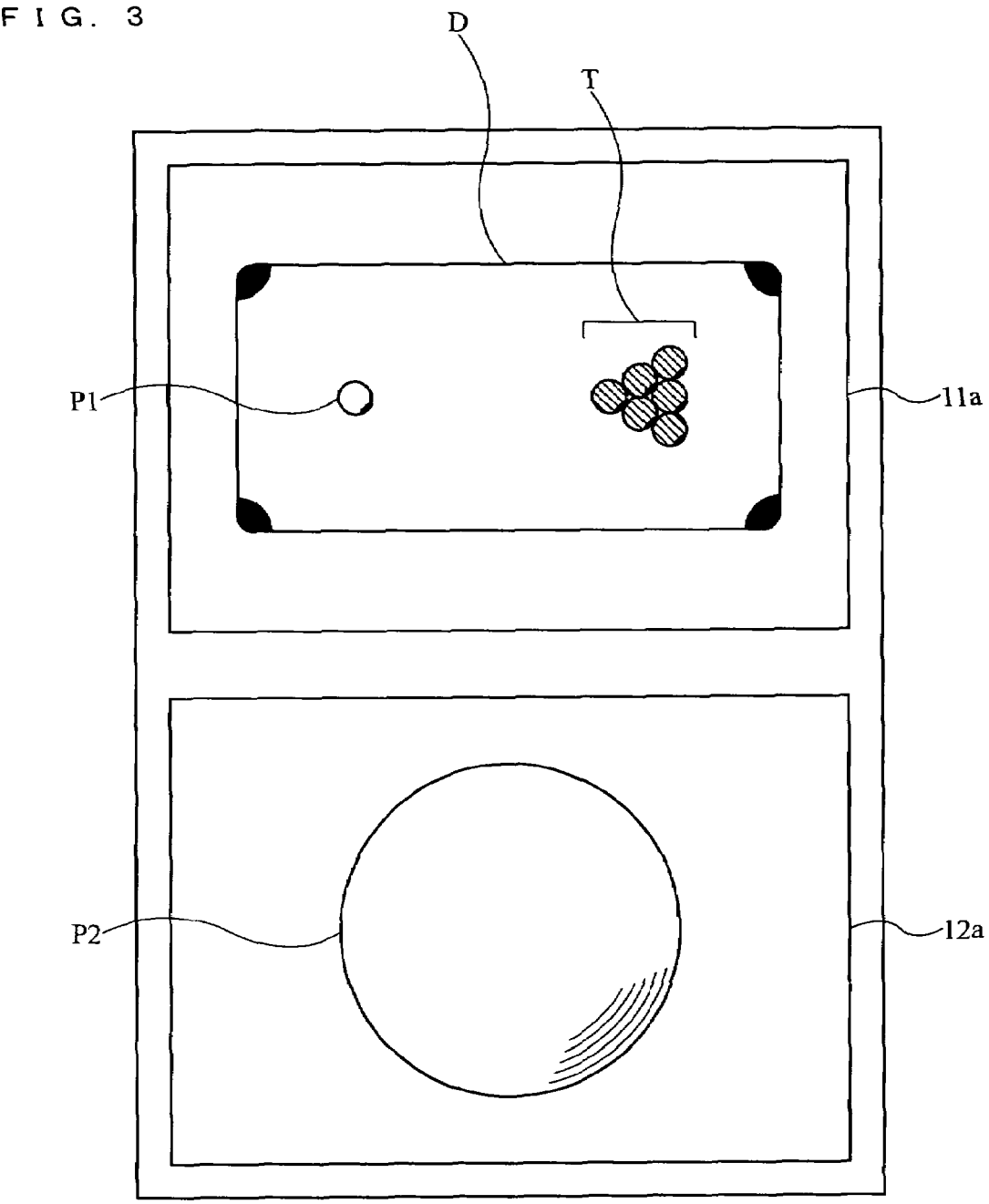
FIG. 3 shows an example of a first game image and a second game image displayed on a first display screen 11a and a second display screen 12a, respectively, by a video game program according to the first embodiment.
Figure 4:
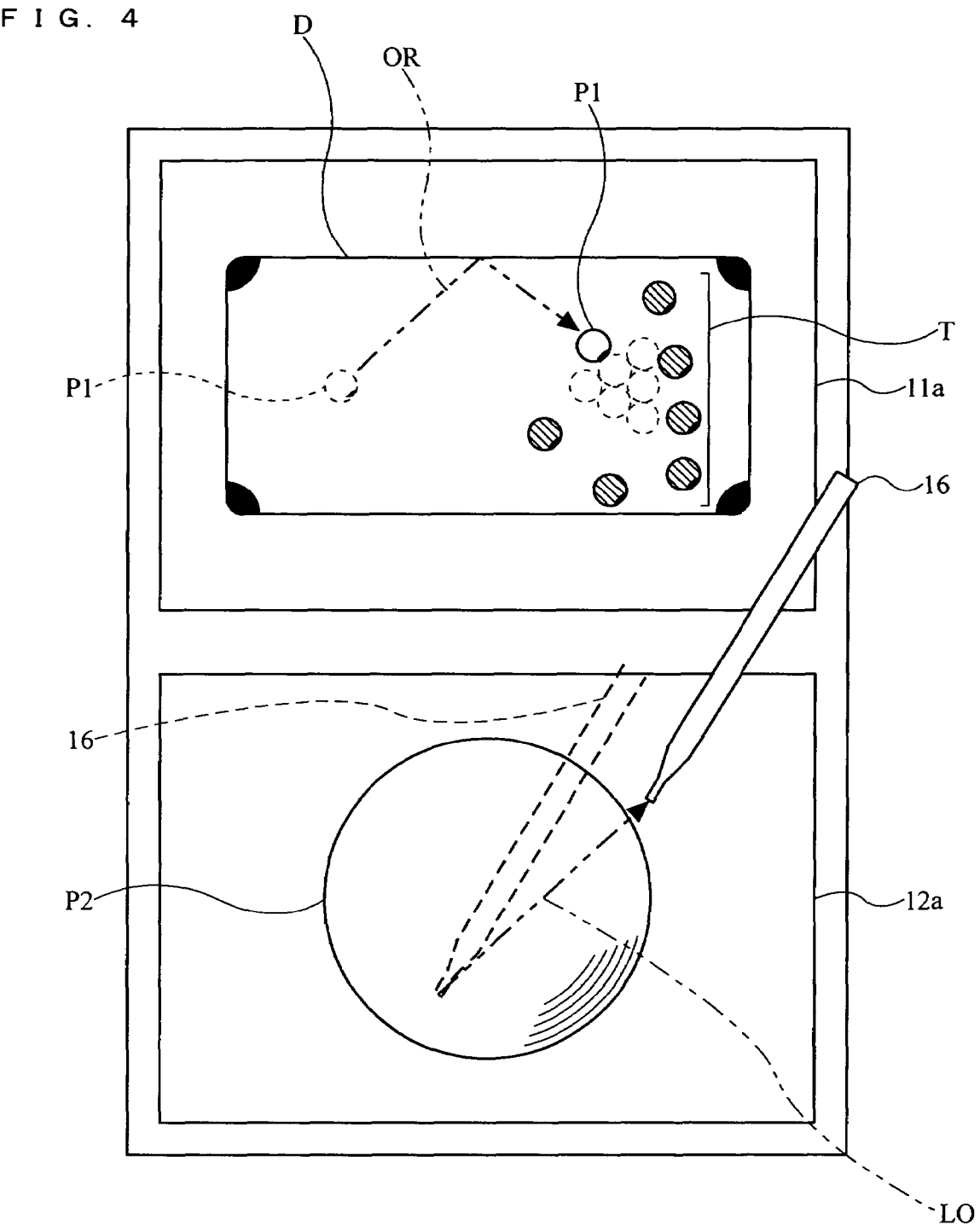
FIG. 4 shows an example of how the first game image on the first display screen 11a changes in response to a change in the input to the second display screen 12a of FIG. 3.

A video game of the video game program of the present embodiment will now be described. In the first embodiment, a player character P1 displayed on the first display screen 11a is moved according to a change in the input to a character pattern P2 on the second display screen 12a. The outline of the flow of the video game program will now be described referring to FIG. 3 and FIG. 4, before describing the flow in greater detail, in order to facilitate the understanding of the present invention. FIG. 3 shows an example of the first game image and the second game image displayed on the first display screen 11a and the second display screen 12a, respectively, by the video game program. FIG. 4 shows an example of how the first game image on the first display screen 11a changes in response to a change in the input to the second display screen 12a.

As shown in FIG. 3, the first game image is displayed on the first display screen 11a of the video game device 1, and the second game image representing a graphic pattern associated with the first game image is displayed on the second display screen 12a. The first game image shows the game space as viewed from a predetermined point of view. The graphic pattern represented by the second game image is an image of a graphic pattern depending on the type of the game, such as a character or an item appearing in the game space, and the graphic pattern is associated by a program with an image included in the first game image.

Specifically, the video game program renders a dual-screen billiards video game, and displays, as the first game image, a billiard table D including one cue ball P1 and six object balls T thereon on the first display screen 11a. The cue ball P1 is an image of a player character that can be operated by the player, and each object ball T is an image that is moved around on the billiard table D, the movement being induced by a collision with the cue ball P1, etc. An image of the operated cue ball P2, which is an enlarged image of the cue ball P1 as viewed from above, is displayed in the second game image on the second display screen 12a as the character pattern of the present invention. The cue ball P1 and the operated cue ball P2 are associated with each other by the video game program so that a change in the input to the operated cue ball P2 via the touch panel 13 is reflected in the change in the appearance (i.e., a movement in the present embodiment) of the cue ball P1 in the first game image. Since the second display screen 12a is covered by the touch panel 13, a change in the input to the operated cue ball P2 can be detected by detecting an input to a region of the touch panel 13 corresponding to the display region of the operated cue ball P2 displayed on the second display screen 12a. FIG. 4 shows how this happens in the first game image and the second game image.

As shown in FIG. 4, the player uses the stylus 16 to give an input to the touch panel 13 covering the second display screen 12a. In other words, the player specifies an input to the operated cue ball P2 displayed on the second display screen 12a. The video game device 1 detects the change in the input to detect a continuous input in a first direction LO, for example. When the continuous input in the first direction LO is detected, the initial direction and the initial velocity, for example, of the cue ball P1 on the first display screen 11a are calculated based on at least two parameters included in the change in the continuous input. The initial direction and the initial velocity correspond to the change condition data in the present invention. The cue ball P1 moves while the movement direction and the movement step are calculated based on the initial direction and the initial velocity, thereby producing the first game image in which the cue ball P1 moves along a track line OR on the billiard table D, and the first game image is displayed on the first display screen 11a. Thus, the first game image on the first display screen 11a is changed based on a change in the input to the touch panel 13 covering the second display screen 12a. While the stylus 16 is dragged in a straight line in the first direction LO in the illustrated example, it may alternatively be dragged in a curved or S-shaped line. If intermediate coordinate positions between the start point and the end point are used as parameters, the cue ball P1 can be moved along an S-shaped track line, for example. In such a case, the cue ball P1 is moved while calculating the spin direction and/or the spin speed of the ball.

Figure 5:
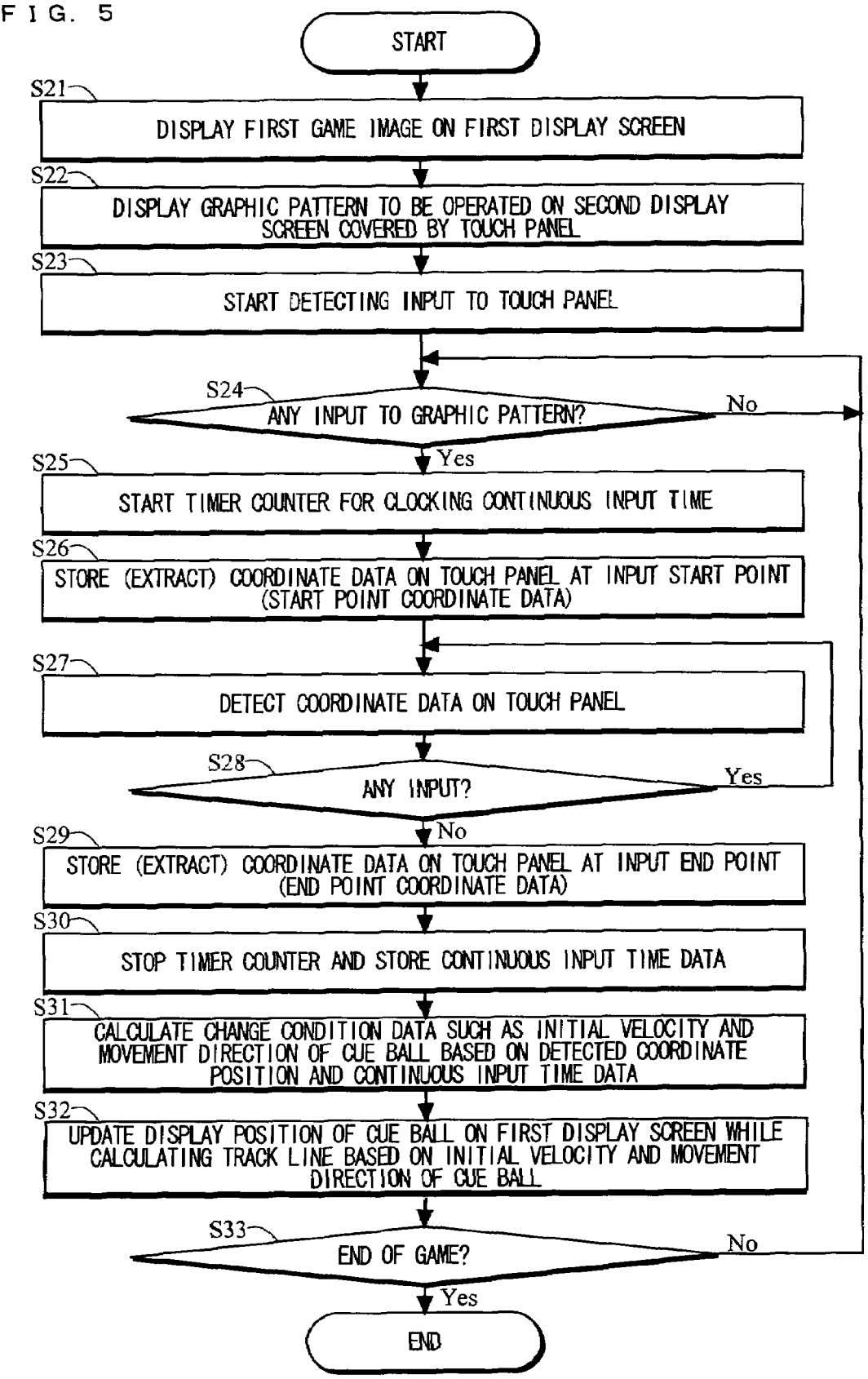
FIG. 5 is a flow chart showing an operation performed by the video game program according to the first embodiment.
Figure 6A:
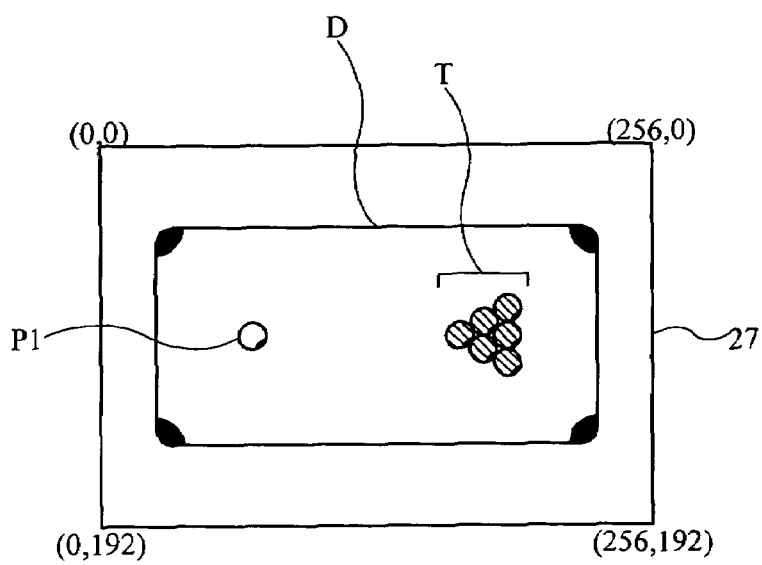
FIG. 6A to FIG. 6C are diagrams used for illustrating the concept of a first VRAM 27, a second VRAM 28 and a touch panel 13 of FIG. 2.
Figure 6B:
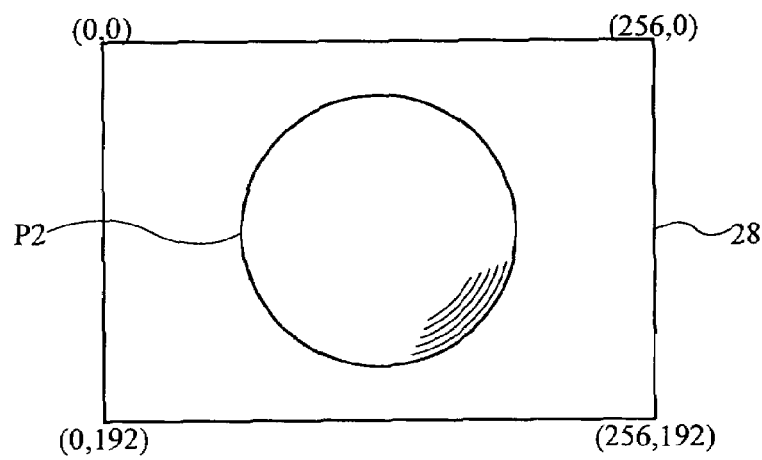
Figure 6C:
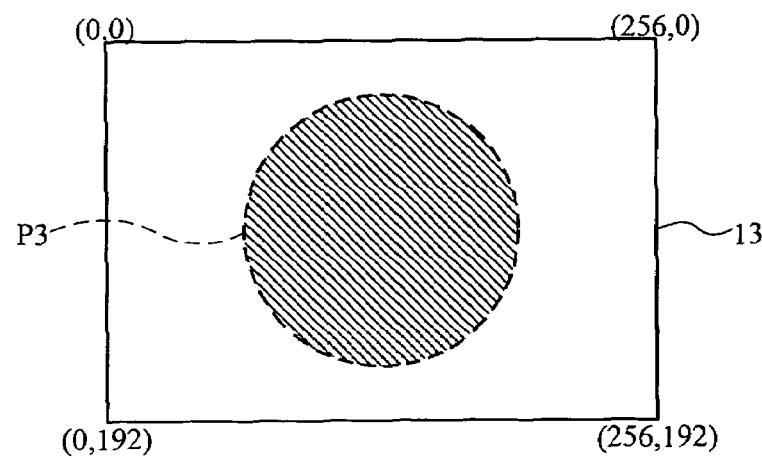

Next, operations performed by the video game program will be described in detail with reference to FIG. 5 and FIG. 6A to FIG. 6C. FIG. 5 is a flow chart showing an operation performed by the video game program, FIG. 6A is a diagram showing the concept of data stored in the first VRAM 27, FIG. 6B is a diagram showing the concept of data stored in the second VRAM 28, and FIG. 6C is a diagram showing the concept of the coordinate system of the touch panel 13.

First, when the power supply (not shown) of the video game device 1 is turned ON, a boot program (not shown) is executed by the CPU 21, whereby the video game program stored in the cartridge 17 is loaded to the WRAM 22. The loaded video game program is executed by the CPU 21, thereby performing steps shown in FIG. 5 (an abbreviation "S" is used for "step" in FIG. 5).

First, the first GPU 23 operates in response to an instruction from the CPU 21 to load various graphics data included in the video game program such as graphics data of a billiard table, and the first game image is rendered in the first VRAM 27 (step 21). Specifically, the billiard table D, the cue ball P1 and the object balls T are rendered in the rendering area of the first VRAM 27 as shown in FIG. 6A. Then, the first game image in the first VRAM 27 is displayed on the first LCD 11. Next, the second GPU 24 operates in response to an instruction from the CPU 21. Graphics data of a character pattern included in the video game program is loaded, and the graphic pattern associated with the first game image is rendered in the second VRAM 28 as the second game image (step 22). Specifically, a character pattern (operated cue ball) P2, being a graphic pattern to be operated, is rendered in the rendering area of the second VRAM 28 as shown in FIG. 6B. Then, the second game image in the second VRAM 28 is displayed on the second LCD 12. After steps 21 and 22, the player can start playing the billiards video game.

The CPU 21 starts detecting an input to the touch panel 13 (step 23). As shown in FIG. 6C, the touch panel 13 has a coordinate system corresponding to that of the second VRAM 28 for outputting data of a coordinate position corresponding to a position that is input (specified) by the stylus 16 or a finger of the player. Thus, in step 23, the CPU 21 detects the coordinate position outputted from the touch panel 13 (including the device driver controlling the touch panel 13).

Then, the CPU 21 determines whether or not there is an input to the character pattern P2 (step 24). Specifically, the CPU 21 determines whether or not the coordinate position initially detected on the touch panel 13 (i.e., the coordinate position to be the start point from which a change in the input starts) is included in a coordinate region P3 (see FIG. 6C) in which the character pattern P2 (see FIG. 6B) is rendered. If the detected coordinate position is included in the coordinate region P3, the CPU 21 determines that it is an input to the character pattern P2, and the process proceeds to step 25. If not, the process repeats step 23.

If there is an input to the character pattern P2 in step 24, the CPU 21 performs steps 25 to 30 as follows to detect a change in the input to the touch panel 13. First, the CPU 21 starts the timer counter for clocking the amount of time for which a continuous input is being made (step 25). Then, the CPU 21 temporarily stores, in the WRAM 22, the coordinate position data at the input start point detected in step 24 (step 26). The coordinate position data of the start point stored in step 26 is the coordinate position at the input start point as used in the example embodiment presented herein.

Then, the CPU 21 detects input coordinates from the touch panel 13 at regular intervals (step 27), and repeats step 27 until there is no longer an input from the touch panel 13 (step 28). Thus, in steps 27 and 28, while a touch operation to the touch panel 13 is being performed continuously, the CPU 21 keeps detecting the change in the input in response to the touch operation. In the present embodiment, it is determined that the continuous input is finished if the data input from the touch panel 13 is discontinued even once. In other embodiments, it may be determined that the continuous input is finished only if no data input from the touch panel 13 is detected over a number of consecutive detections, for example.

When it is determined in step 28 that there is no longer an input from the touch panel 13 (i.e., when the player's touch operation to the touch panel 13 is finished), the CPU 21 stores the coordinate position data at the input end point in the WRAM 22 (step 29). The coordinate position data of the end point stored in step 29 is the coordinate position at the input end point as used in the example embodiment presented herein.

Then, the CPU 21 stops the timer counter when the continuous input is discontinued, and stores, in the WRAM 22, continuous input time data representing how long the continuous input has lasted (step 30). The continuous input time data stored in step 30 is the input detection time as used in the example embodiment presented herein.

In steps 26 and 29 as described above, at least two parameters (i.e., the coordinate position at the input start point and that at the input end point) are extracted from the change in the input to the touch panel 13. In the present embodiment, a total of three parameters are used, including the continuous input time data (input detection time) detected in step 30. As will be described later, although the two coordinate positions, one at the start point and another at the end point, are extracted in the present embodiment, the present embodiment is not limited thereto. For example, coordinate position data of some or all of the intermediate points between the start point and the end point may be used in other embodiments. While the amount of time between the start point and the end point is used as the continuous input time data in the present embodiment, time data at an intermediate point between the start point and the end point may be used in other embodiments. Such time data at an intermediate point can be used to change the action of the cue ball P1 based on the change in the input during the first half of the period between the start point and the end point, whereby it may be possible to move the cue ball P1 more intuitively according to the player's operation. The types and number of parameters to be used can be determined based on the intended action of the player object (the cue ball P1 in the present embodiment) on the first display screen 11a. More parameters may be needed for a more complicated action, whereas two parameters may suffice for a simple action such as a movement along a straight line.

Then, based on the stored parameters, the CPU 21 calculates change condition data such as the initial velocity and the movement direction of the cue ball P1 in the first game image on the first display screen 11a (step 31). Specifically, the CPU 21 calculates the initial velocity and the movement direction of the cue ball P1 based on three parameters: the coordinate position data at the input start point (i.e., the start point) obtained in step 26; the coordinate position data at the input end point (i.e., the endpoint) obtained in step 29; and the continuous input time data between the start point and the end point obtained in step 30.

For example, for a start point $(x1, y1)$, an end point $(x2, y2)$ and a continuous input time $t1$, the CPU 21 calculates a movement direction $(\Delta x, \Delta y)$ by obtaining the differences between the x coordinates and the y coordinates, i.e., $\Delta x = x2 - x1$ and $\Delta y = y2 - y1$. If the cue ball P1 is currently positioned at a coordinate position $(X, Y)$, the cue ball P1 is moved from the coordinate position $(X, Y)$ in the movement direction $(\Delta x, \Delta y)$ (the first direction LO: FIG. 4). The initial velocity of the cue ball P1 is calculated so that the initial velocity is higher for a shorter continuous input time $t1$. For example, the initial velocity is calculated as follows: initial velocity=predetermined initial velocity/continuous input time $t1$. The coordinate difference $(\Delta x, \Delta y)$ may be taken into consideration in the calculation of the initial velocity so that the initial velocity is higher for a greater difference and vice versa.

The initial velocity and the movement direction can also be calculated by using only two parameters: the start point $(x1, y1)$ or the end point $(x2, y2)$; and the continuous input time $t1$. For example, the movement direction of the cue ball P1 can be calculated as the difference between the start point or the end point and a reference position $(x0, y0)$ (being the center of the character pattern P2), and the initial velocity of the cue ball P1 can be calculated based on the continuous input time $t1$. Moreover, the initial velocity and the movement direction can be calculated using two parameters of the start point $(x1, y1)$ and the end point $(x2, y2)$. For example, the movement direction can be calculated as the difference between the end point and the start point, and the initial velocity can be calculated based on the value of the difference. Thus, the first game image on the first display screen 11a can be changed in response to the change in the input to the touch panel 13 as long as two parameters can be extracted from the change in the input to the touch panel 13. In addition to the initial velocity and the movement direction, other conditions for moving the cue ball P1 may be calculated, e.g., the acceleration, the deceleration, the movement distance and the movement velocity.

Then, based on the change condition data, such as the initial velocity and the movement direction, being the results of calculation performed based on parameters in step 31, the CPU 21 determines the conditions for moving the cue ball P1.

Then, based on the conditions, the CPU 21 displays, on the first display screen 11*a*, the cue ball P1 rolling along the track line OR (see FIG. 4) while performing calculations with respect to various factors such as the deceleration due to friction against the billiard table, the collision with or reflection off the rails, and the like (step 32). The CPU 21 repeats steps 24 to 32 until the game ends (step 33).

While the cue ball P1 is moved in a straight line based on a change in the input to the touch panel 13 along a straight line in the present embodiment, the present embodiment is not limited thereto. For example, the player may make a stroke on the touch panel 13 generally along a straight line while drawing small circles in the generally-straight stroke, in response to which the appearance of the cue ball P1 can be changed so that the cue ball P1 starts moving in the direction of the straight line with a spin thereon depending on how the circles are drawn and the direction of the circles.

As described above, according to the first embodiment, the cue ball P1 moves on the first display screen 11*a* according to the change in the input given to the character pattern, i.e., according to the input pattern given through a touch operation on the touch panel 13, whereby it is possible to provide a video game with a novel operation. Since the character pattern (the operated cue ball P2) corresponding to the player character (the cue ball P1) displayed on the first display screen 11*a* is displayed on the second display screen 12*a* on a larger scale than the player character, the player can relatively accurately specify an intended position. Since the player operates the character pattern displayed on the second display screen 12*a* while the player character whose appearance changes is separately displayed on the first display screen 11*a*, it is possible to prevent the player character from being hid from the player by the player's hand performing a touch operation. Since the appearance of the player character on the first display screen 11*a* is changed according to a relatively accurate input position and a relatively accurate change in the input to the character pattern while the appearance of the character pattern displayed on the second display screen 12*a* is not changed, it is possible to visualize a change in the appearance intended by the player on the first display screen 11*a* while preventing the player from losing track of the graphic pattern to be operated by the player.

Second Embodiment

A video game device including a computer for executing a video game program according to a second embodiment will now be described. While the present embodiment is also directed to a case where the appearance of the player character included in the game image is changed, the appearance of the entire game image may be changed in other embodiments. The video game device of the second embodiment is similar to that of the first embodiment. Therefore, like elements are denoted by like reference numerals, and will not be further described below.

Figure 7:
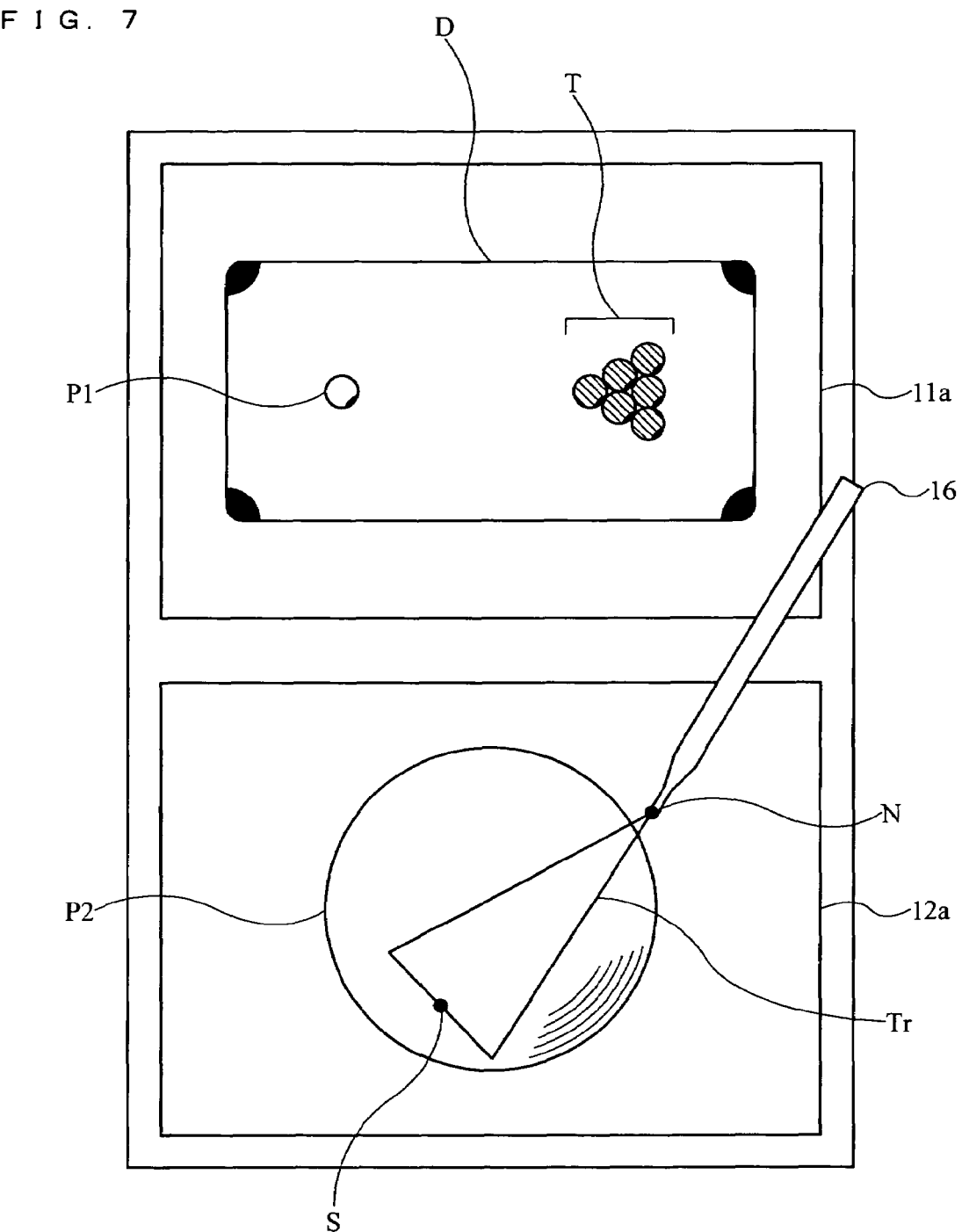
FIG. 7 shows an example of a first game image and a second game image displayed on the first display screen 11a and the second display screen 12a, respectively, by a video game program according to the second embodiment.
Figure 8:
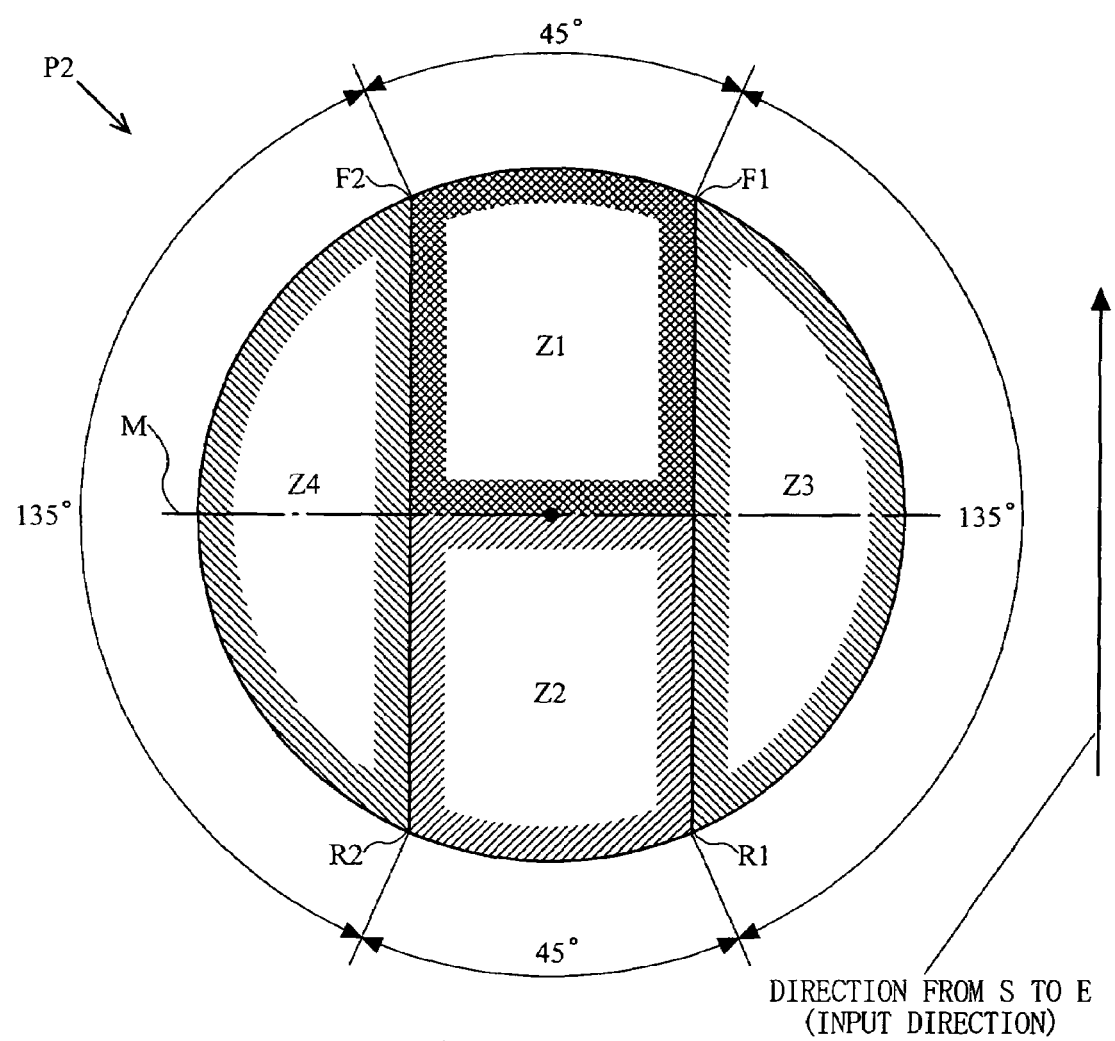
FIG. 8 shows an example of how an operated cue ball P2 of FIG. 7 is divided into a plurality of defined regions Z1 to Z4.

A video game of the video game program of the present embodiment will now be described. Also in the second embodiment, as in the first embodiment, the player character P1 is displayed on the first display screen 11*a* and the character pattern P2 is displayed on the second display screen 12*a*. The player character P1 is moved on the first display screen 11*a* according to a change in the input given to the character pattern P2 on the second display screen 12*a*. The outline of the flow of the video game program will now be described referring to FIG. 7 to FIG. 13, before describing the flow in greater detail. FIG. 7 shows an example of a first game image and a second game image displayed on the first display screen 11*a* and the second display screen 12*a*, respectively, by the video game program. FIG. 8 shows an example of how the character pattern P2 is divided into a plurality of defined regions Z1 to Z4. FIG. 9 to FIG. 13 each show an example of how the first game image on the first display screen 11*a* changes when a change in the input is made on the second display screen 12*a*.

As shown in FIG. 7, the first game image is displayed on the first display screen 11*a* of the video game device 1, and the second game image representing a graphic pattern associated with the first game image is displayed on the second display screen 12*a*, as in the first embodiment. The first game image shows the game space as viewed from a predetermined point of view. The graphic pattern represented by the second game image is an image of a graphic pattern depending on the type of the game, such as a character or an item appearing in the game space, and the graphic pattern is associated by a program with an image included in the first game image.

Specifically, the video game program renders a dual-screen billiards video game, and displays, as the first game image, the billiard table D including one cue ball P1 and six object balls T thereon on the first display screen 11*a*, as in the first embodiment. The cue ball P1 is an image of a player character that can be operated by the player, and each object ball T is an image that is moved around on the billiard table D, the movement being induced by a collision with the cue ball P1, etc. An image of the operated cue ball P2, which is an enlarged image of the cue ball P1 as viewed from above, is displayed in the second game image on the second display screen 12*a* as the character pattern of the present invention. The cue ball P1 and the operated cue ball P2 are associated with each other by the video game program so that a change in the input to the operated cue ball P2 via the touch panel 13 is reflected in the change in the appearance (i.e., a movement in the present embodiment) of the cue ball P1 in the first game image. Since the second display screen 12*a* is covered by the touch panel 13, a change in the input to the operated cue ball P2 can be detected by detecting an input to a region of the touch panel 13 corresponding to the display region of the operated cue ball P2 displayed on the second display screen 12*a*.

As shown in FIG. 7, the player makes a continuous input with the stylus 16 to the touch panel 13 covering the second display screen 12*a* so as to specify an input to the operated cue ball P2. The video game device 1 determines the direction of the continuous input by detecting changes in the continuous input. In the video game program of the second embodiment, a shape Tr is rendered in the second game image in response to changes in the continuous input so as to show the player how the input is being changed. Specifically, where there is a continuous input on the touch panel 13 starting from a start point S in the display region of the operated cue ball P2, the shape Tr is rendered according to the positional relationship between the start point S and a current point N. The shape Tr is an isosceles triangle in which the point N is the apex, the base has a predetermined length, and the start point S is located at the midpoint along the base.

When the continuous input is detected and the continuous input is finished, the movement step (movement direction), the velocity, etc., of the cue ball P1 on the first display screen 11*a* are calculated based on at least two parameters (e.g., the start point and the end point of the continuous input) included in the change in the continuous input. In the present embodiment, the shot mode is also determined based on the parameters.

Specifically, the shot mode is determined based on the relationship between the positions of the start point S and the end point E included in the change in the continuous input and the defined regions obtained by dividing the display region of the operated cue ball P2. The display region of the operated cue ball P2 is divided into, for example, four defined regions Z1 to Z4, as shown in FIG. 8. The positions of the defined regions Z1 to Z4 vary depending on the direction from the start point S to the endpoint E (hereinafter referred to as the "input direction") FIG. 8 shows the defined regions Z1 to Z4 where the input direction is an upward direction on the drawing sheet.

Referring to FIG. 8, a straight line M is defined to be perpendicular to the input direction and passing through the center of the operated cue ball P2. A point F1 is defined as a point along the circumference of the operated cue ball P2 that is 22.5° off the input direction rightward, and a point F2 is defined as a point along the circumference of the operated cue ball P2 that is 22.5° off the input direction leftward (thus the points F1 and F2 together make an angle of 45° with respect to the center of the operated cue ball P2). Similarly, a point R1 is defined as a point along the circumference of the operated cue ball P2 that is 22.5° off a direction opposite to the input direction rightward, and a point R2 is defined as a point along the circumference of the operated cue ball P2 that is 22.5° off a direction opposite to the input direction leftward (thus the points R1 and R2 together make an angle of 45° with respect to the center of the operated cue ball P2). In other words, the angle between the point F1 and the point R1 is 135°, and the angle between the point F2 and the point R2 is also 135°. A straight line F1-R1 is defined between the point F1 and the point R1, and a straight line F2-R2 is defined between the point F2 and the point R2. Then, the straight line F1-R1 and the straight line F2-R2 are both parallel to the input direction, and the display region of the operated cue ball P2 is divided in three by the straight line F1-R1 and the straight line F2-R2. A region on the right-hand side of the straight line F1-R1 (i.e., the most rightward region of the three divisions) is the defined region Z3. A region on the left-hand side of the straight line F2-R2 (i.e., the most leftward region of the three divisions) is the defined region Z4. A region between the straight line F1-R1 and the straight line F2-R2 (i.e., the center region of the three divisions) corresponds to the defined regions Z1 and Z2. The region between the straight line F1-R1 and the straight line F2-R2 is further divided into an upper region and a lower region by the straight line M. The upper region is the defined region Z1, and the lower region is the defined region Z2. As described above, the defined regions Z1 to Z4 are determined based on the input direction, and thus the orientation of the defined regions Z1 to Z4 vary depending on the input direction. Specifically, the defined regions Z1 to Z4 are rotated about the center of the operated cue ball P2 as the input direction changes.

The defined regions Z1 to Z4 may or may not be displayed in the second game image. As will be described later, since the operated cue ball P2 is divided into the defined regions Z1 to Z4 in such a manner that the change in the appearance of the cue ball P1 (the shot mode) can be predicted based on the direction in which the cue ball P1 is moved, the player can intuitively make the prediction even if the defined regions Z1 to Z4 are not displayed in the game image. In the above description, the operated cue ball P2 displayed in the second game image is divided into the defined regions Z1 to Z4 for the sake of simplicity. In practice, however, the coordinate region P3 in which the operated cue ball P2 is rendered (see FIG. 6C) can be divided into the defined regions Z1 to Z4.

There are various shot modes different from one another in how the cue ball moves, and one of the shot modes is selected depending on the point at which the cue strikes the cue ball. Specifically, there can be various shot modes depending on the position at which the cue ball P1 is struck, including "center ball" where the cue strikes the center of the cue ball P1, "draw" where a lower portion of the cue ball P1 is struck, "follow" where an upper portion of the cue ball P1 is struck, "left curve" where a right portion of the cue ball P1 is struck, and "right curve" where a left portion of the cue ball P1 is struck. If the start point S included in the change in the continuous input is located in the defined region Z3, the shot mode is set to "left curve". If the start point S included in the change in the continuous input is located in the defined region Z4, the shot mode is set to "right curve". If the start point S included in the change in the continuous input is located in the defined region Z1, the shot mode is set to "follow". If the start point S and the end point E included in the change in the continuous input are both located in the defined region Z2, the shot mode is set to "draw". If the start point S included in the change in the continuous input is located in the defined region Z2 and if the end point E is located in the defined region Z1 or outside the display region of the operated cue ball P2, the shot mode is set to "center ball".

The movement step (the movement direction), the velocity and the shot mode correspond to the change condition data as used in the present embodiment. The cue ball P1 is moved while the movement direction, the movement step, the spin direction, the spin speed, etc., of the cue ball P1 are calculated based on the change condition data, thereby producing the first game image in which the cue ball P1 moves on the billiard table D, and the first game image is displayed on the first display screen 11a.

FIG. 9 to FIG. 13 each show an example of the first game image in which the cue ball P1 moves on the billiard table D according to a particular shot mode. In all of the examples shown in FIG. 9 to FIG. 13, the input direction (indicated by an arrow extending from "S" to "E") is from left to right on the drawing sheet.

Figure 9:
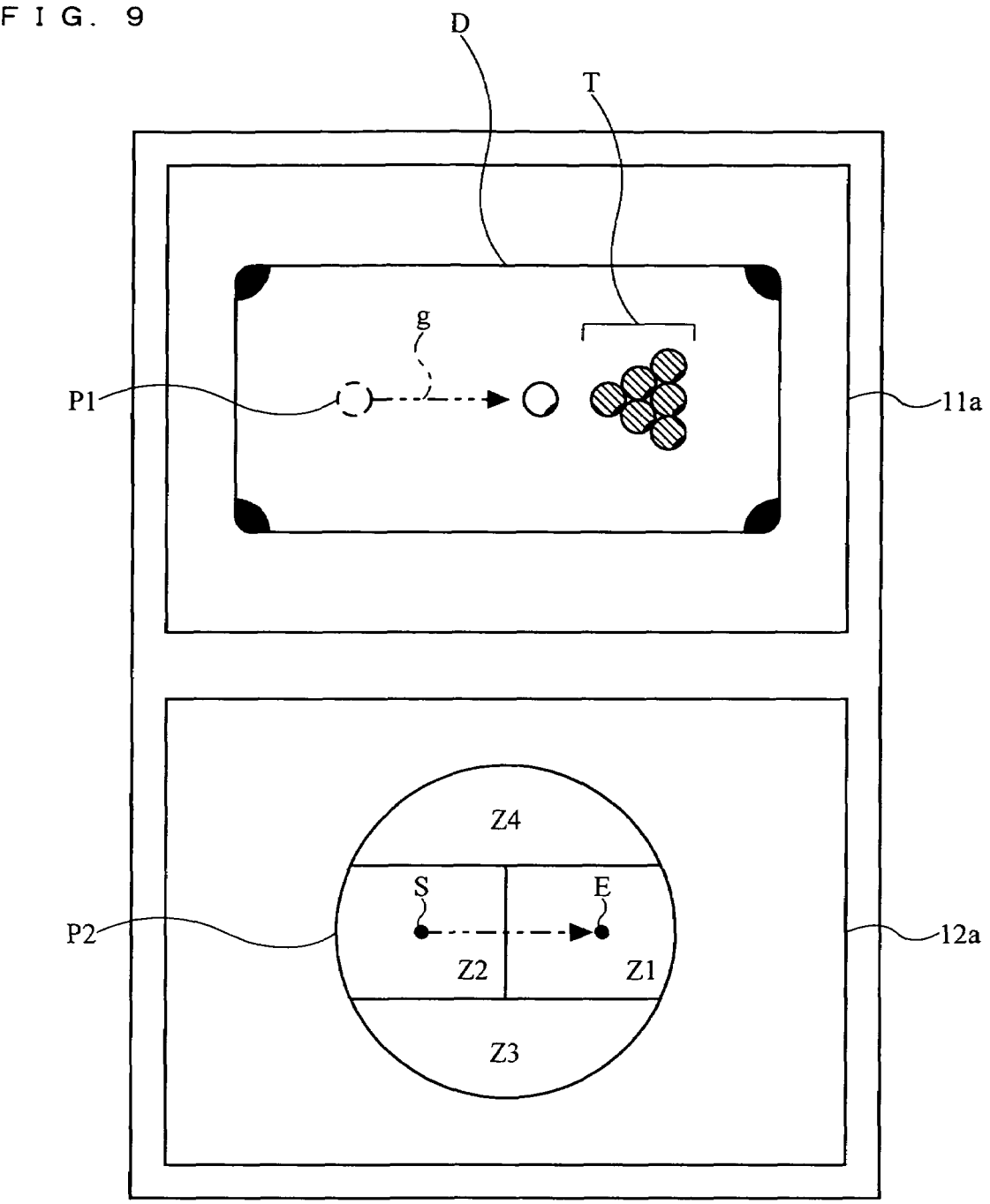
FIG. 9 shows an example of how the first game image on the first display screen 11a changes when a start point S is located in the defined region Z2 of the operated cue ball P2 shown in FIG. 7 and an end point E is located in the defined region Z1.

In FIG. 9, the start point S of the continuous input is located in the defined region Z2 of the operated cue ball P2, and the end point E is located in the defined region Z1. When such a continuous input is detected, the movement step (the movement direction), the velocity and the shot mode for the cue ball P1 on the first display screen 11a are calculated based on at least two parameters indicating the positions of the start point S and the end point E included in the change in the continuous input. In the illustrated example, the shot mode is set to "center ball". The cue ball P1 is moved while the movement step, the velocity, etc., of the cue ball P1 are calculated based on the shot mode "center ball", thereby producing the first game image in which the cue ball P1 moves on the billiard table D along the track line g, and the first game image is displayed on the first display screen 11a. As shown in FIG. 9, in the shot mode "center ball", the track line g is a straight line extending in the input direction and no spin is set for the cue ball P1 until the cue ball contacts another object.

Figure 10:
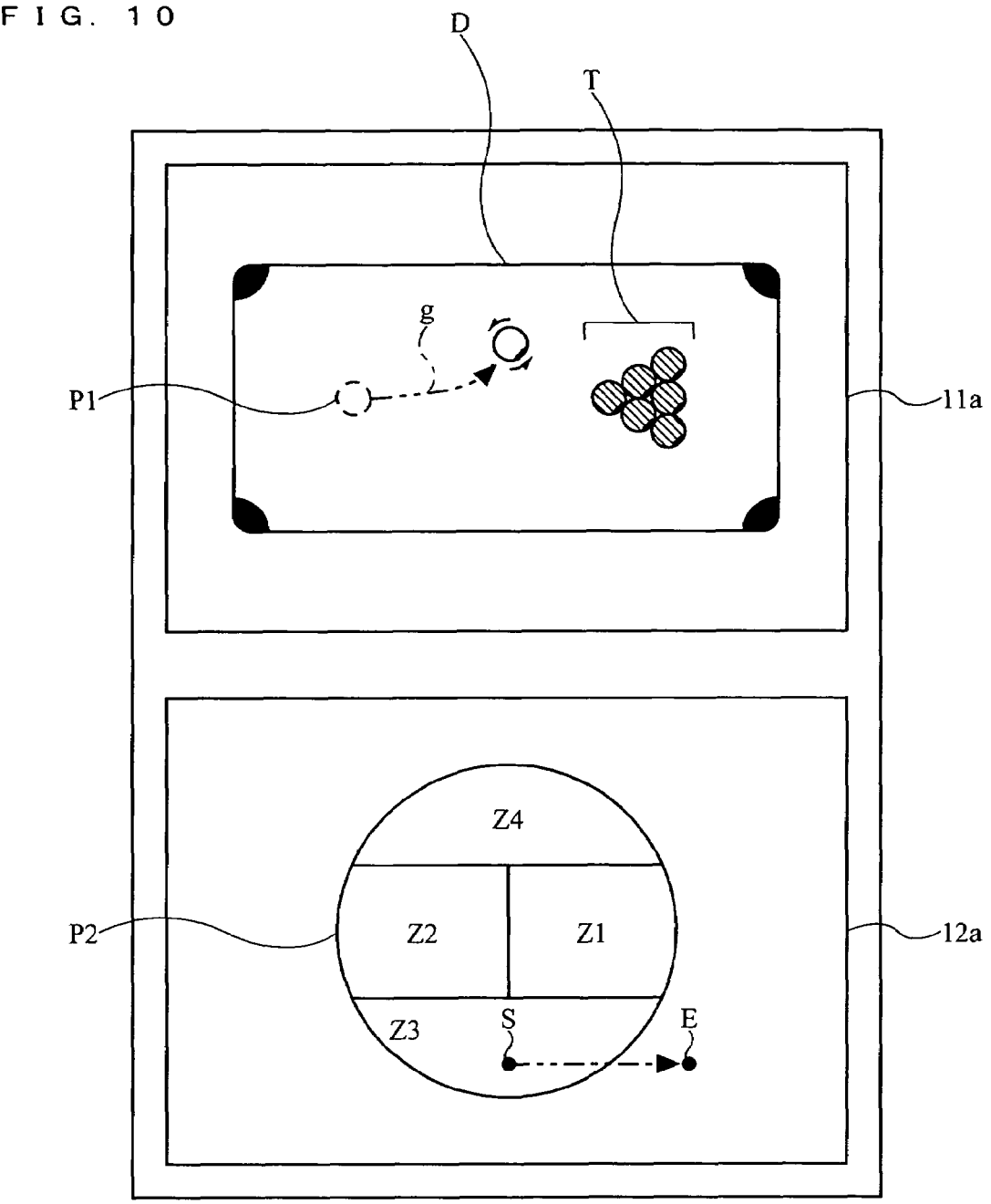
FIG. 10 shows an example of how the first game image on the first display screen 11a changes when the start point S is located in the defined region Z3 of the operated cue ball P2 shown in FIG. 7 and the end point E is located outside the display region of the operated cue ball P2.

In FIG. 10, the start point S of the continuous input is located in the defined region Z3 of the operated cue ball P2, and the end point E is located outside the display region of the operated cue ball P2. Then, the shot mode is set to "left curve", and the movement step and the velocity for the cue ball P1 are calculated based on at least two parameters indicating the positions of the start point S and the end point E. The cue ball P1 is moved while the movement step, the velocity, the spin direction, the spin speed, etc., of the cue ball P1 are calculated based on the shot mode "left curve", thereby producing the first game image in which the cue ball P1 moves on the billiard table D along the track line g, and the first game image is displayed on the first display screen 11a.

As shown in FIG. 10, in the shot mode "left curve", a leftward spin is set for the cue ball P1, and the track line g is a line gradually curving to the left off the input direction until the cue ball contacts another object.

Figure 11:
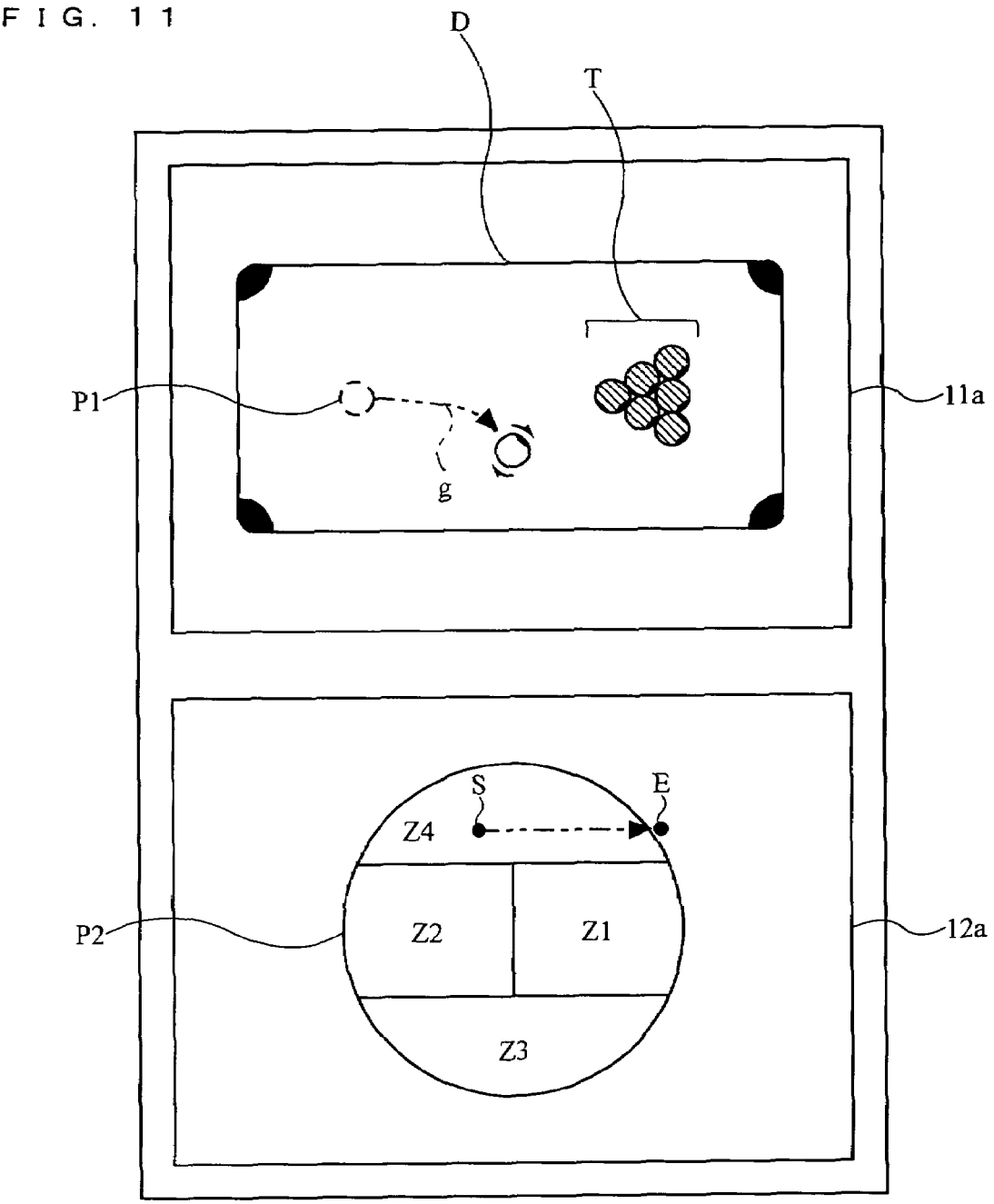
FIG. 11 shows an example of how the first game image on the first display screen 11a changes when the start point S is located in the defined region Z4 of the operated cue ball P2 shown in FIG. 7 and the end point E is located outside the display region of the operated cue ball P2.

In FIG. 11, the start point S of the continuous input is located in the defined region Z4 of the operated cue ball P2, and the end point E is located outside the display region of the operated cue ball P2. Then, the shot mode is set to "right curve", and the movement step and the velocity for the cue ball P1 are calculated based on at least two parameters indicating the positions of the start point S and the end point E. The cue ball P1 is moved while the movement step, the velocity, the spin direction, the spin speed, etc., of the cue ball P1 are calculated based on the shot mode "right curve", thereby producing the first game image in which the cue ball P1 moves on the billiard table D along the track line g, and the first game image is displayed on the first display screen 11a. As shown in FIG. 11, in the shot mode "right curve", a rightward spin is set for the cue ball P1, and the track line g is a line gradually curving to the right off the input direction until the cue ball contacts another object.

Figure 12:
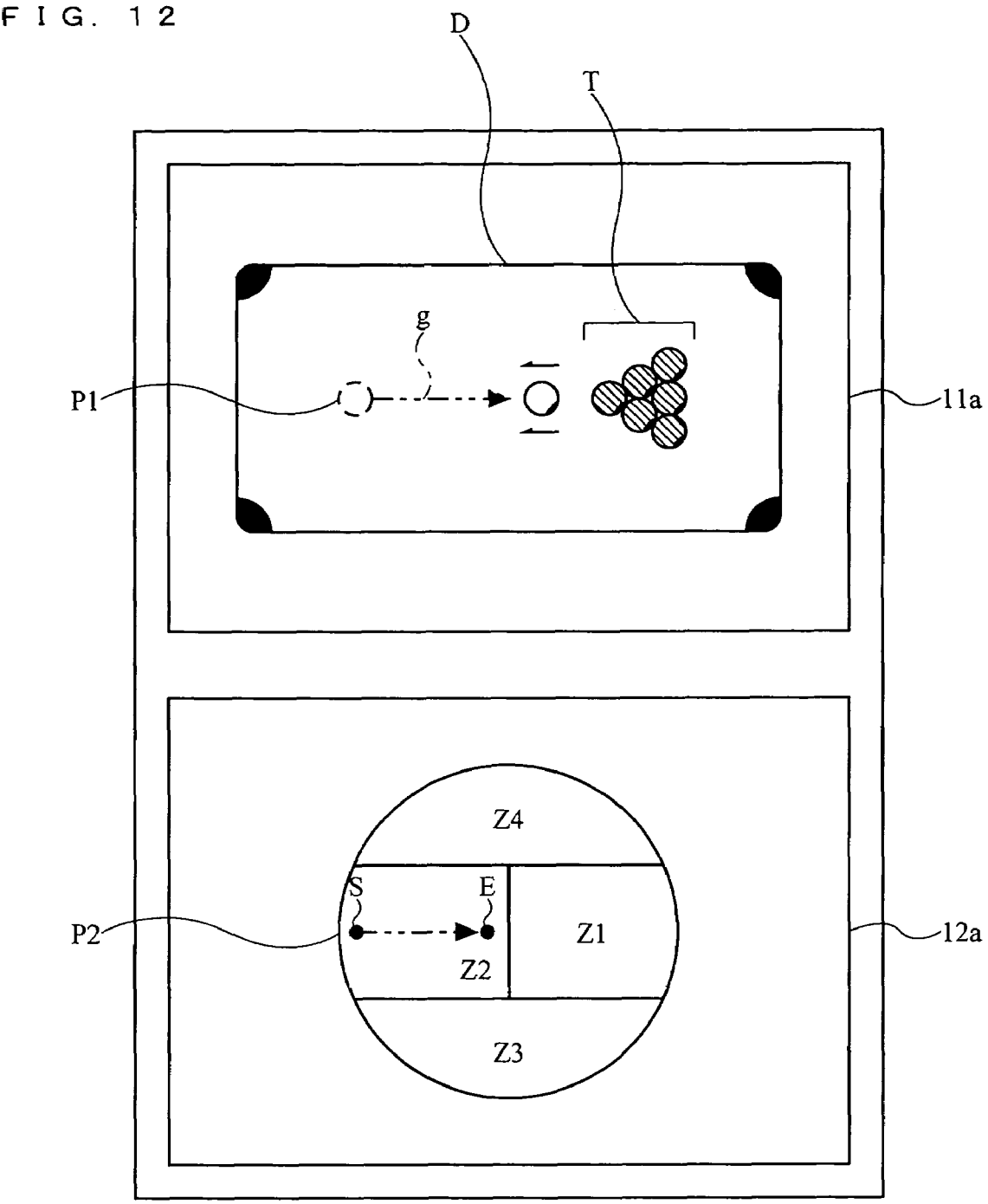
FIG. 12 shows an example of how the first game image on the first display screen 11a changes when the start point S and the end point E are both located in the defined region Z2 of the operated cue ball P2 shown in FIG. 7.

In FIG. 12, the start point S and the end point E of the continuous input are both located in the defined region Z2 of the operated cue ball P2. Then, the shot mode is set to "draw", and the movement step and the velocity for the cue ball P1 are calculated based on at least two parameters indicating the positions of the start point S and the end point E. The cue ball P1 is moved while the movement step, the velocity, the spin direction, the spin speed, etc., of the cue ball P1 are calculated based on the shot mode "draw", thereby producing the first game image in which the cue ball P1 moves on the billiard table D along the track line g, and the first game image is displayed on the first display screen 11a. As shown in FIG. 12, in the shot mode "draw", a backward spin is set for the cue ball P1, and the track line g is a straight line extending in the input direction until the cue ball contacts another object. After the cue ball contacts an object ball T, the cue ball is pulled back away from the object ball T.

Figure 13:
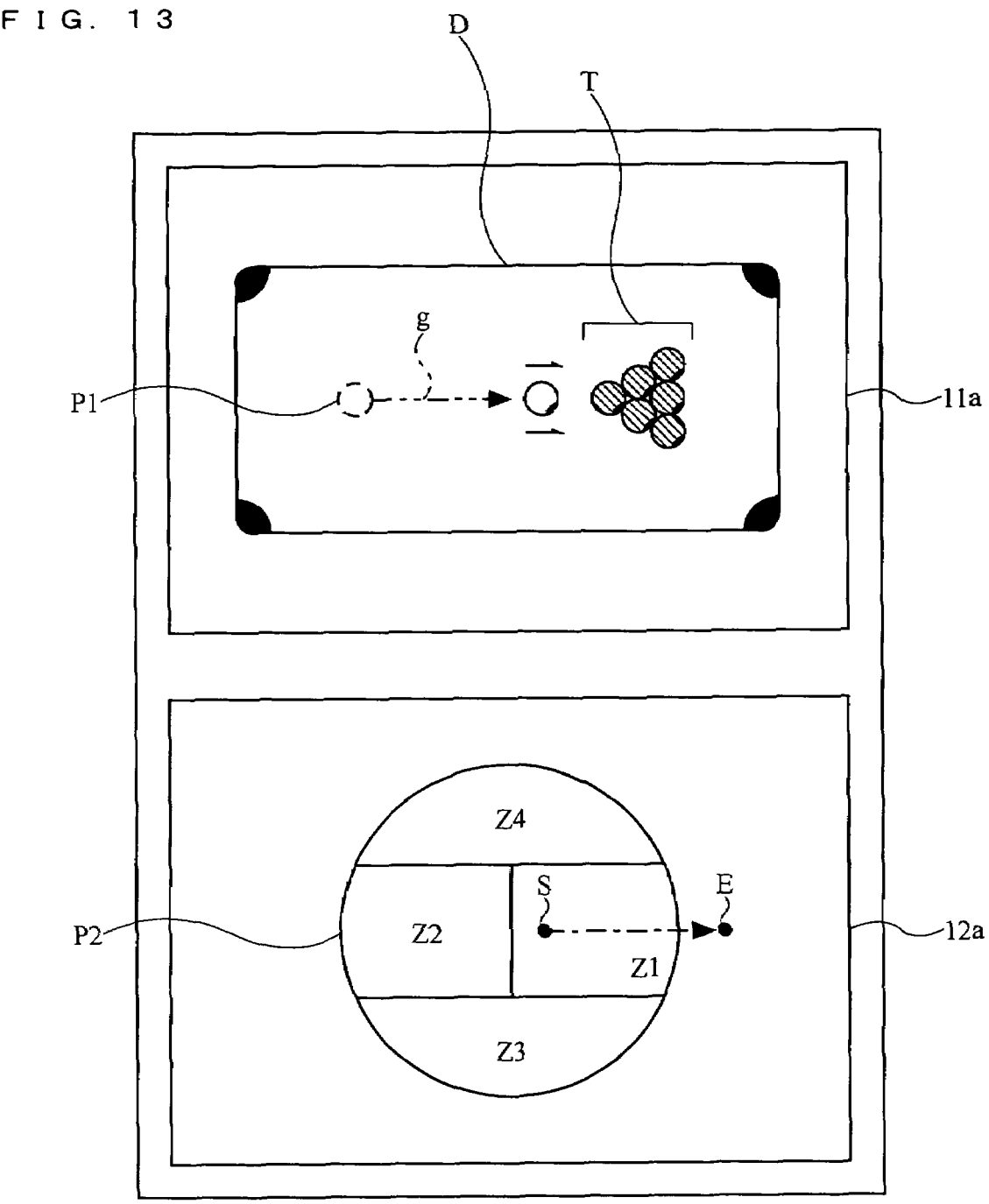
FIG. 13 shows an example of how the first game image on the first display screen 11a changes when the start point S is located in the defined region Z1 of the operated cue ball P2 shown in FIG. 7 and the end point E is located outside the display region of the operated cue ball P2.

In FIG. 13, the start point S of the continuous input is located in the defined region Z1 of the operated cue ball P2, and the end point E is located outside the display region of the operated cue ball P2. Then, the shot mode is set to "follow", and the movement step and the velocity for the cue ball P1 are calculated based on at least two parameters indicating the positions of the start point S and the end point E. The cue ball P1 is moved while the movement step, the velocity, the spin direction, the spin speed, etc., of the cue ball P1 are calculated based on the shot mode "follow", thereby producing the first game image in which the cue ball P1 moves on the billiard table D along the track line g, and the first game image is displayed on the first display screen 11a. As shown in FIG. 13, in the shot mode "follow", a forward spin is set for the cue ball P1, and the track line g is a straight line extending in the input direction until the cue ball contacts another object. After the cue ball contacts an object ball T, the split angle from the object ball T is smaller than that in other shot modes (e.g., the cue ball follows the object ball T that it has just hit). Thus, the first game image on the first display screen 11a is changed based on a change in the input to the touch panel 13 covering the second display screen 12a.

Figure 14:
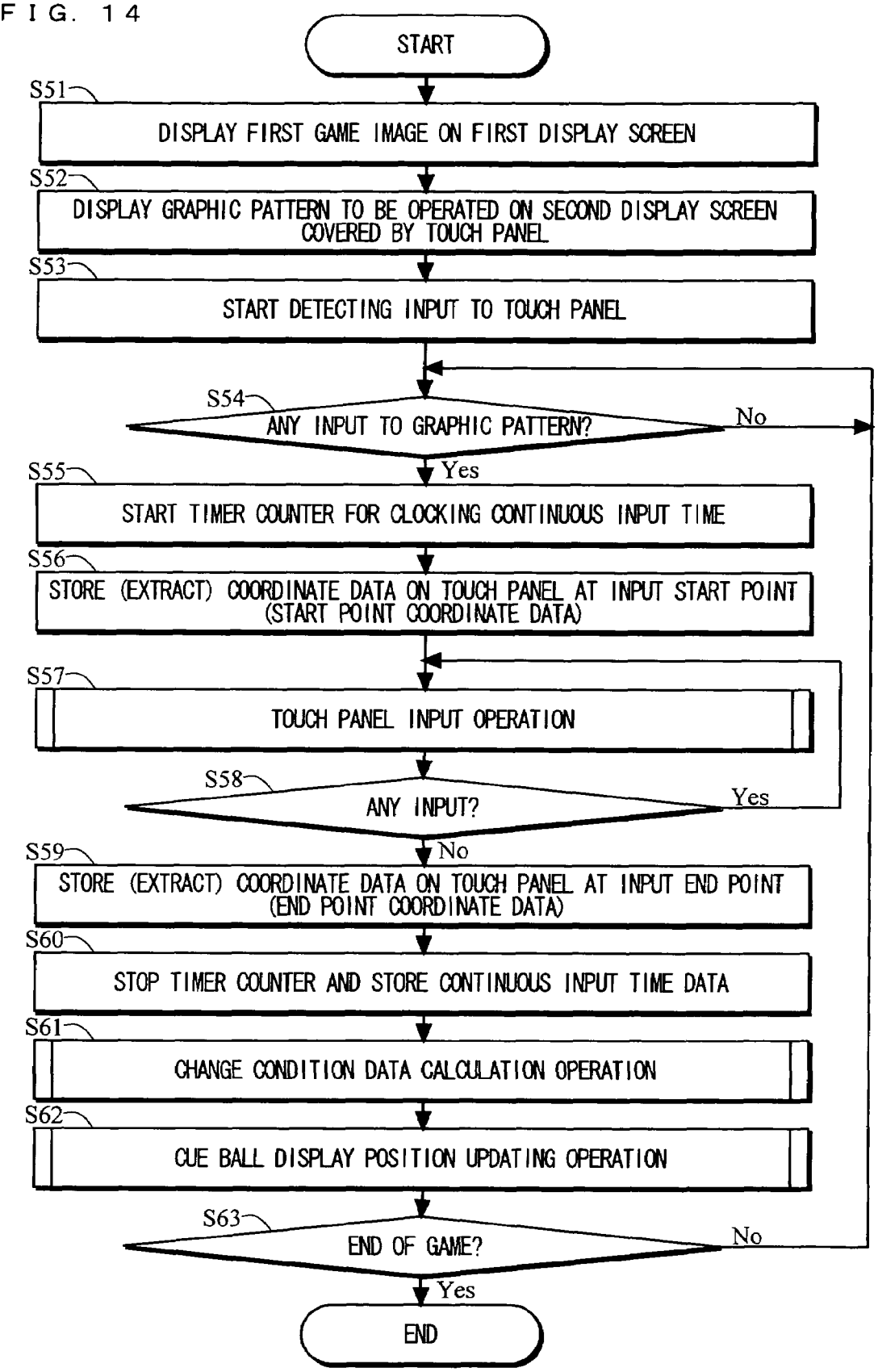
FIG. 14 is a flow chart showing an operation performed by a video game program according to a second embodiment.
Figure 15:
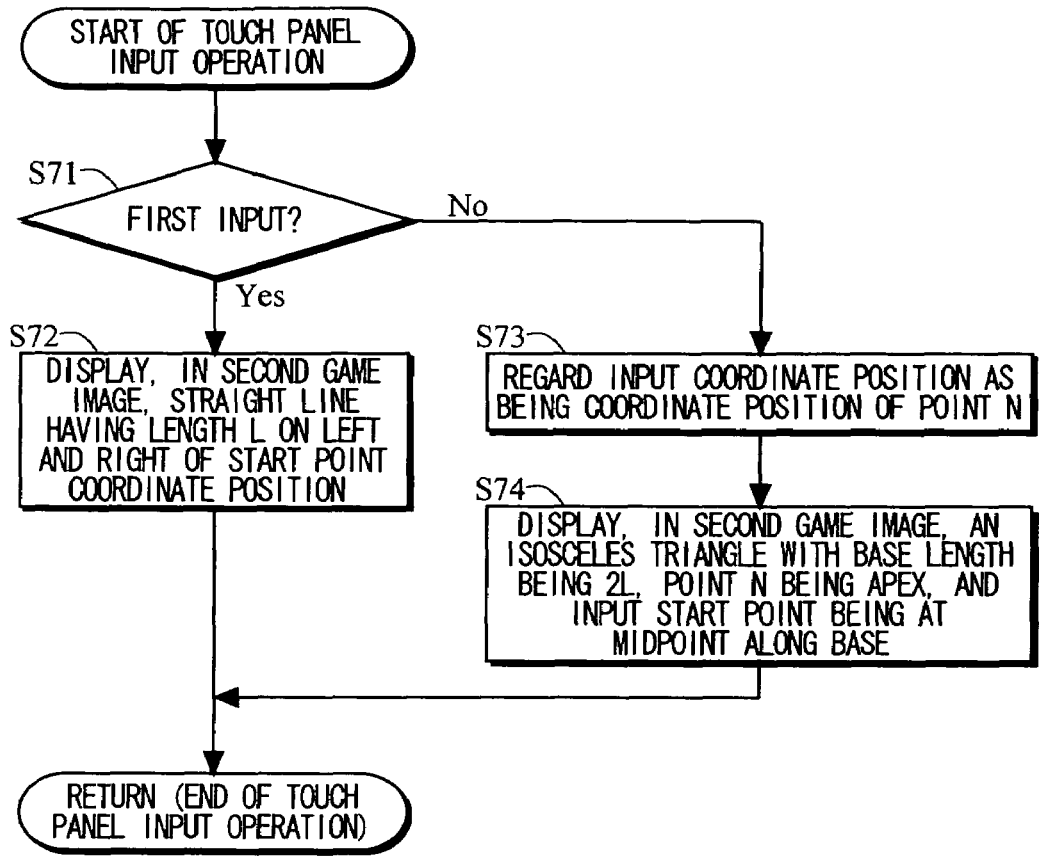
FIG. 15 shows in detail a subroutine of a touch panel input operation in step 57 of FIG. 14.
Figure 16:
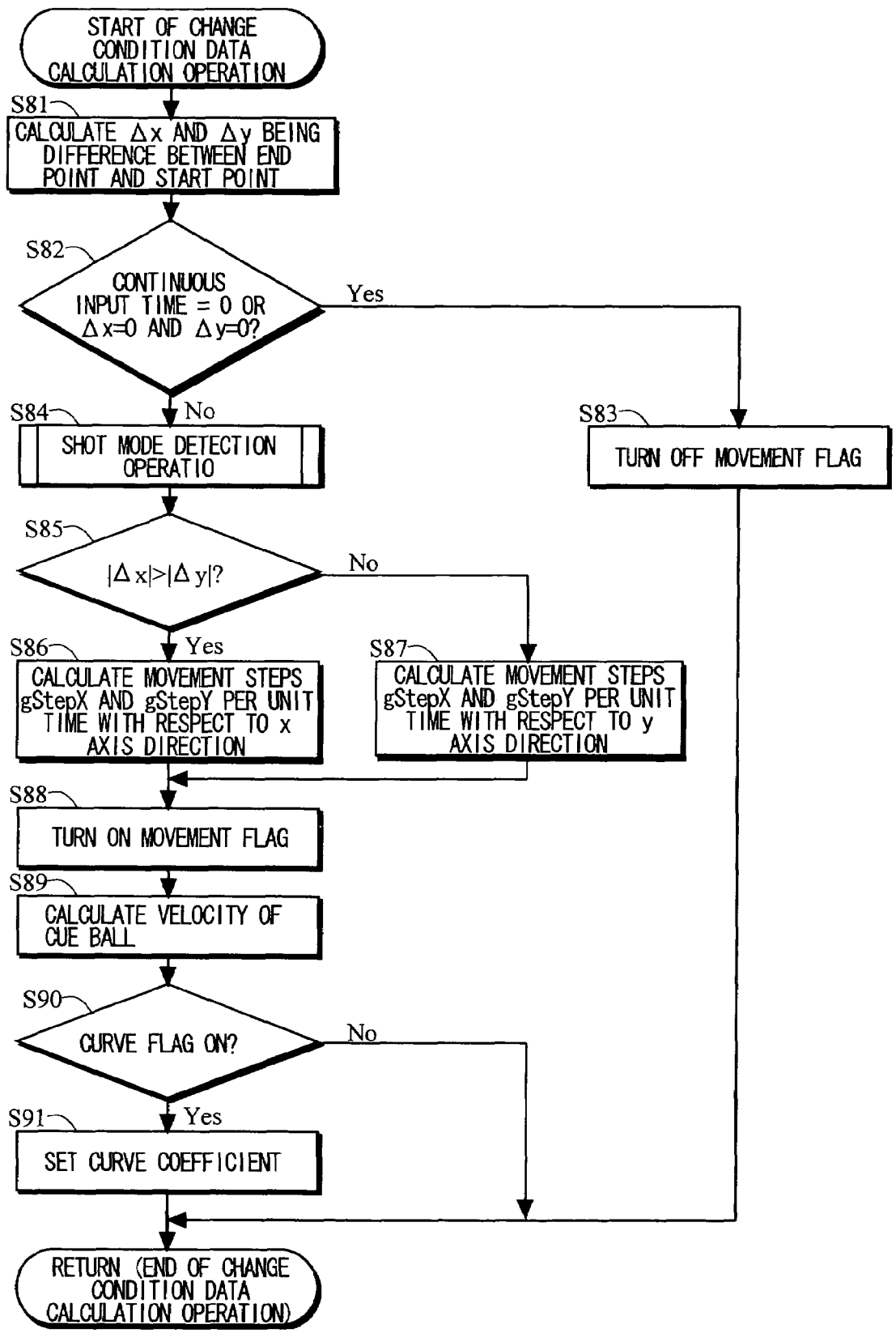
FIG. 16 shows in detail a subroutine of a change condition data calculation operation in step 61 of FIG. 14.
Figure 17:
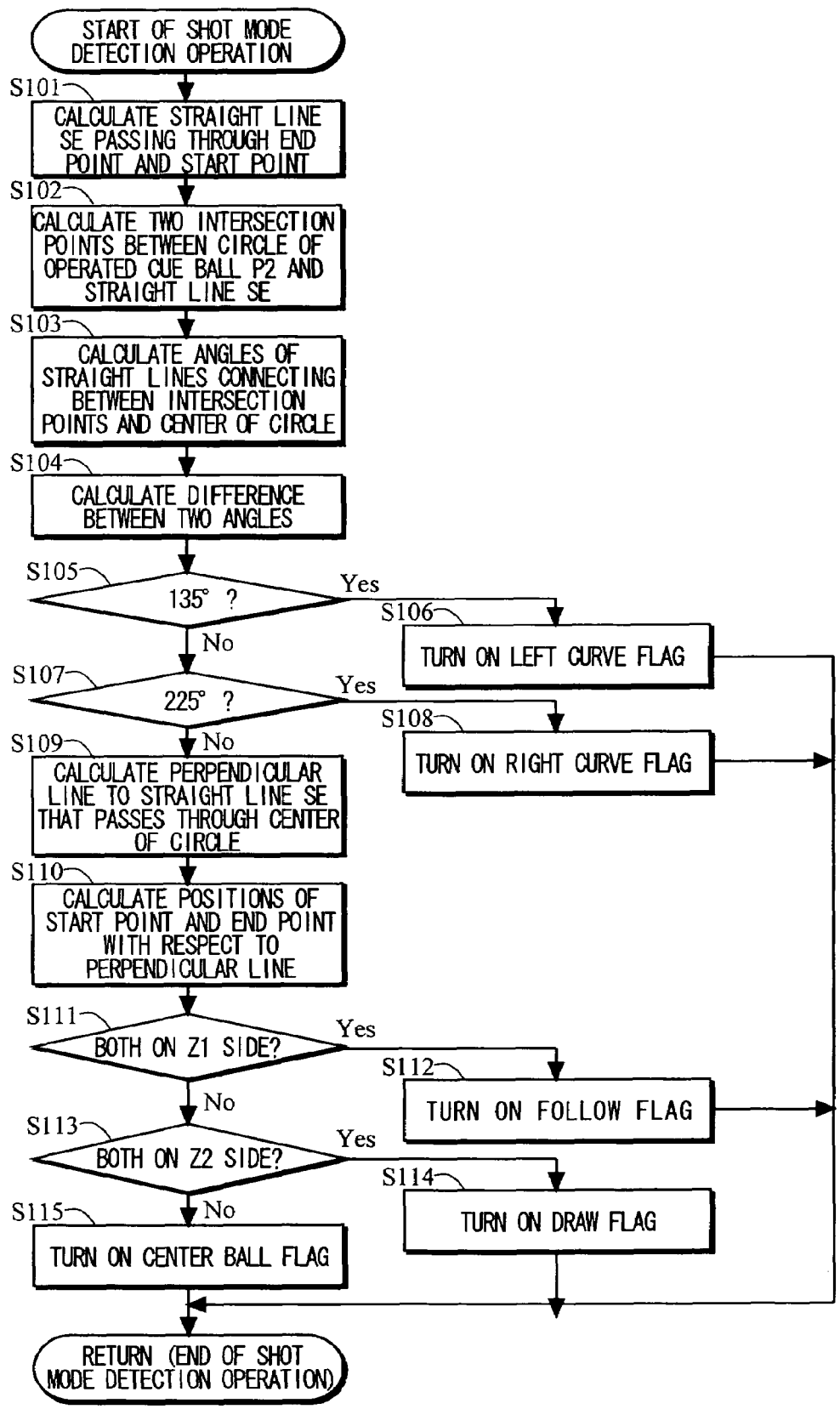
FIG. 17 shows in detail a subroutine of a shot mode detection operation in step 84 of FIG. 16.
Figure 18:
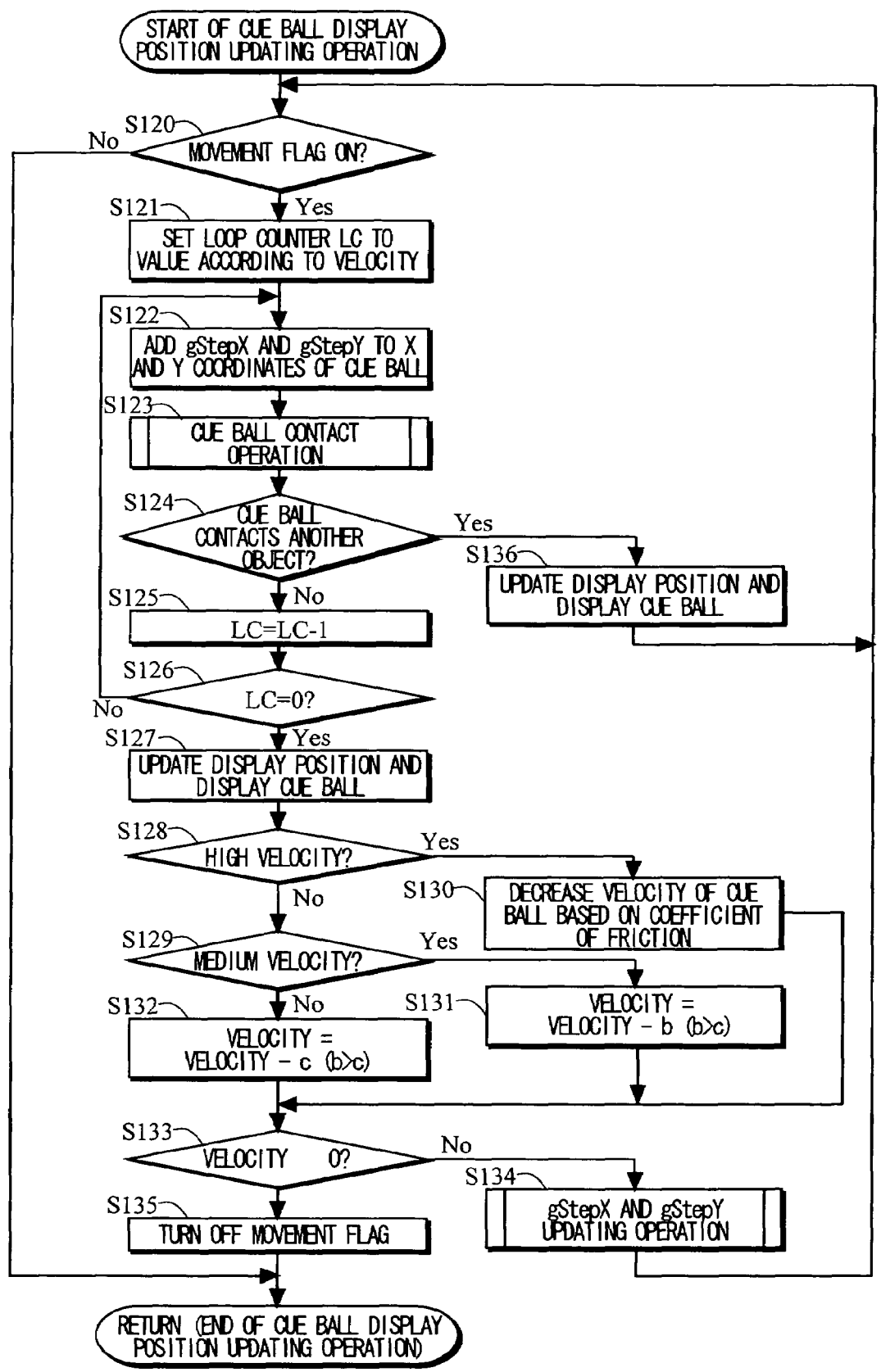
FIG. 18 shows in detail a subroutine of a cue ball display position updating operation in step 62 of FIG. 14.
Figure 19:
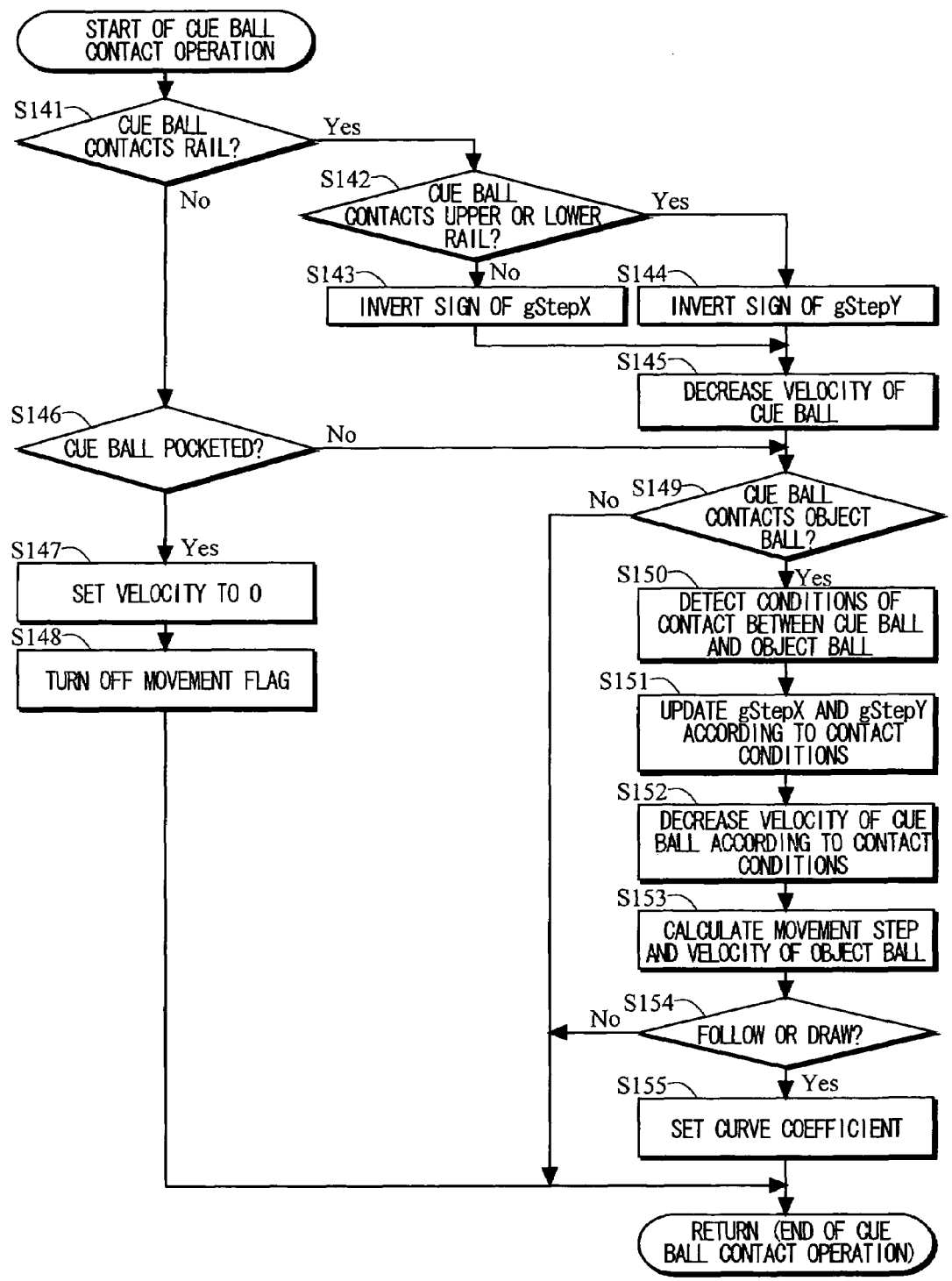
FIG. 19 shows in detail a subroutine of a cue ball contact operation in step 123 of FIG. 18.
Figure 20:
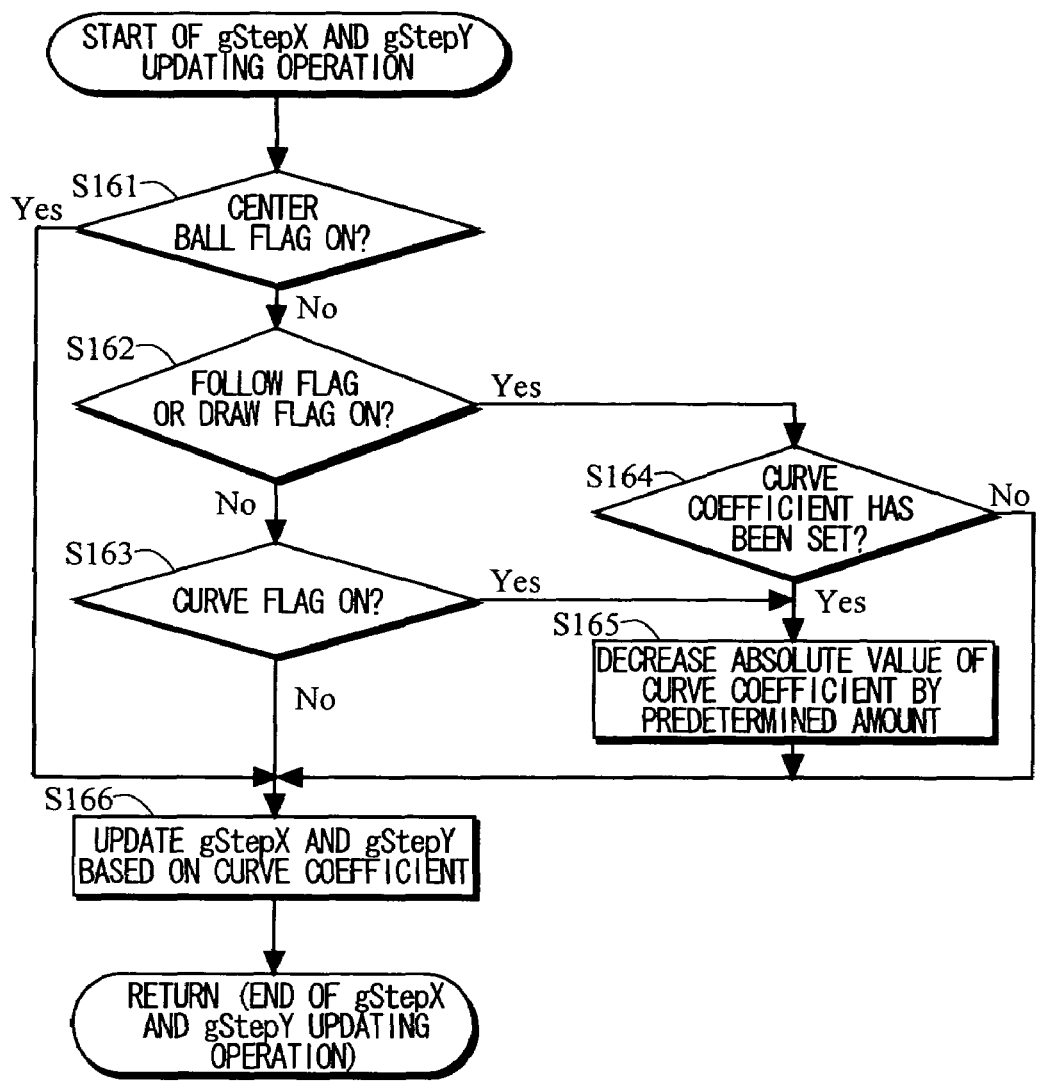
FIG. 20 shows in detail a subroutine of a gStepX and gStepY updating operation in step 134 of FIG. 18.
Figure 21:
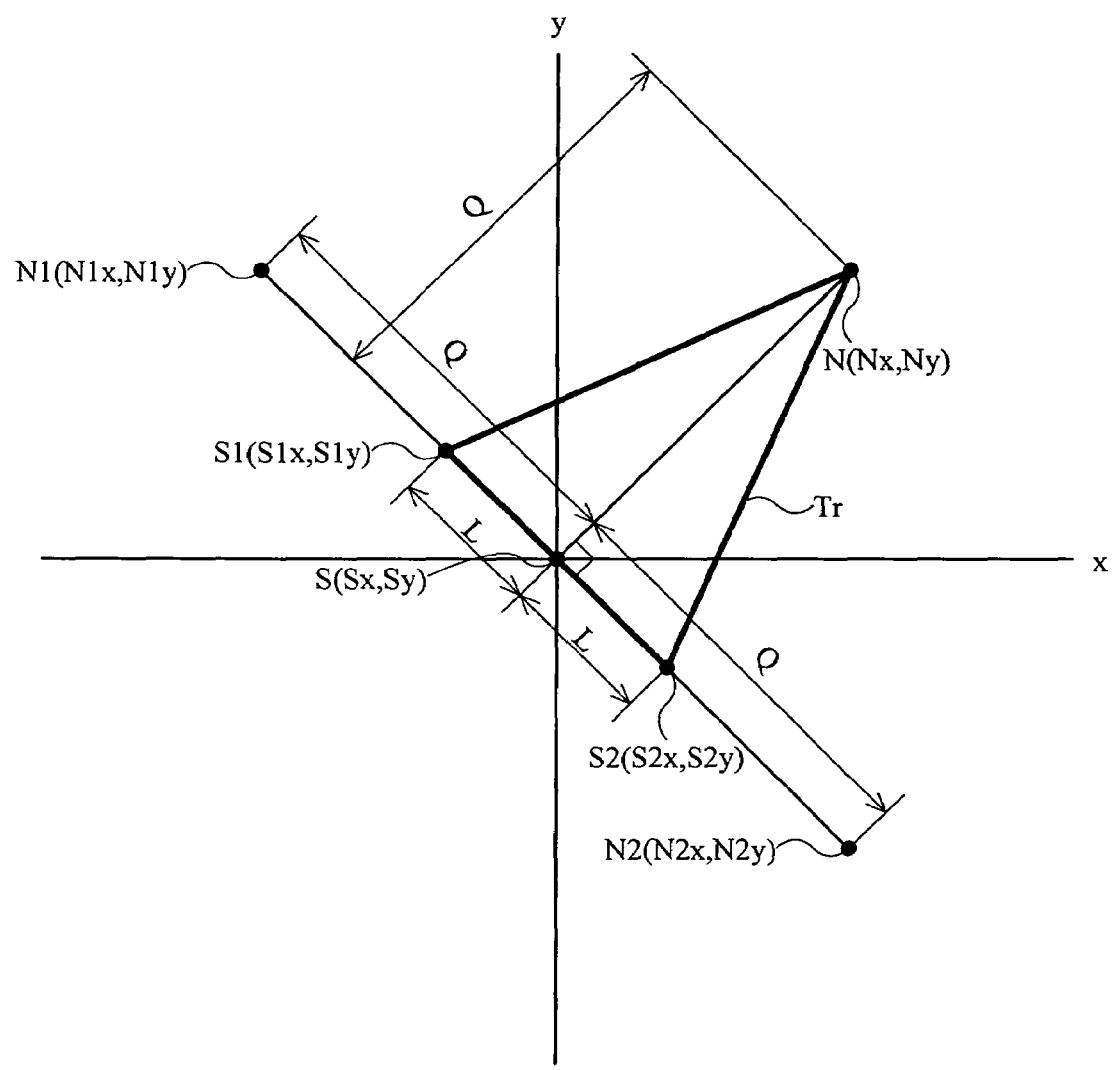
FIG. 21 shows how to produce an isosceles triangle Tr displayed in step 74 of FIG. 15.

Next, operations performed by the video game program will be described in detail with reference to FIG. 14 to FIG. 21. FIG. 14 is a flow chart showing an operation performed by the video game program. FIG. 15 shows in detail a subroutine of a touch panel input operation in step 57 of FIG. 14. FIG. 16 shows in detail a subroutine of a change condition data calculation operation in step 61 of FIG. 14. FIG. 17 shows in detail a subroutine of a shot mode detection operation in step 84 of FIG. 16. FIG. 18 shows in detail a subroutine of a cue ball display position updating operation in step 62 of FIG. 14. FIG. 19 shows in detail a subroutine of a cue ball contact operation in step 123 of FIG. 18. FIG. 20 shows in detail a subroutine of a gStepX and gStepY updating operation in step 134 of FIG. 18. FIG. 21 shows how to produce the isosceles triangle Tr displayed in step 74 of FIG. 15. The first VRAM 27, the second VRAM 28 and the touch panel 13 as used in the operations performed by the video game program are similar in concept to those illustrated in FIG. 6A to FIG. 6C in the first embodiment.

The operation at power-on of the video game device 1 is similar to that of the first embodiment. Steps 51 to 56 of FIG. 14 are similar to steps 21 to 26 of FIG. 5 in the first embodiment, and will not be further described below.

In step 57, the CPU 21 performs the touch panel input operation at regular intervals. The CPU 21 repeats the operation of step 57 until there is no longer an input from the touch panel 13 (step 58). Thus, in steps 57 and 58, while a touch operation to the touch panel 13 is being performed continuously, the CPU 21 continues to perform the input processing operation in response to the touch operation. In the present embodiment, it is determined that the continuous input is finished if the data input from the touch panel 13 is discontinued even once. In other embodiments, it may be determined that the continuous input is finished only if no data input from the touch panel 13 is detected over a number of consecutive detections, for example. Referring to FIG. 15, the touch panel input operation in step 57 will now be described in detail.

Referring to FIG. 15, the CPU 21 determines whether or not it is the first input from the touch panel 13 (step 71). If it is the first input, the CPU 21 displays, in the second game image, a straight line having a length L on the left and right of the coordinate position of the start point (step 72), and the process exits the subroutine. The coordinate position data at the input start point stored in step 56 is used as the coordinate position of the start point. As a result of the operation in step 72, a horizontal straight line having a length of 2L is rendered on the second display screen 12a, with the start point touched by the player being located at the midpoint along the straight line.

If it is determined in step 71 that the input is a second or subsequent input, the CPU 21 temporarily stores, in the WRAM 22, the coordinate position input from the touch panel 13 as the coordinate position data of the current point N (step 73). Then, the CPU 21 displays the isosceles triangle Tr with the point N being the apex (see FIG. 7) in the second game image (step 74), and the process exits the subroutine. The base of the isosceles triangle Tr has a length of 2L, and the isosceles triangle Tr is rendered so that the start point stored in step 56 is at the midpoint along the base. Referring to FIG. 21, how the CPU 21 produces the isosceles triangle Tr will now be described.

Referring to FIG. 21, the start point is denoted as a point S. On the xy plane, the point N is located at the coordinate position N(Nx, Ny), and the point S is located at the coordinate position S(Sx,Sy) The point N(Nx, Ny) is rotated about the point S(Sx, Sy) by 90° and by −90° to obtain points N1 and N2, respectively. The x and y coordinates of the points N1 and N2 are calculated as follows.

$$N1x = \cos(90°) \times (Nx - Sx) - \sin(90°) \times (Ny - Sy)$$

$$N1y = \sin(90°) \times (Nx - Sx) + \cos(90°) \times (Ny - Sy)$$

$$N2x = \cos(-90°) \times (Nx - Sx) - \sin(-90°) \times (Ny - Sy)$$

$$N2y = \sin(-90°) \times (Nx - Sx) + \cos(-90°) \times (Ny - Sy)$$

The length Q of the straight line between the point S and the point N is as follows.

$$Q = \sqrt{(Nx-Sx)^2 + (Ny-Sy)^2}$$

Points S1 and S2 at the opposite ends of the base of the isosceles triangle Tr are located along the straight line N1-N2. Therefore, the x and y coordinates of the points S1 and S2 are calculated as follows.

$$S1x=(L/Q) \times N1x+Sx$$

$$S1y=(L/Q) \times N1y+Sy$$

$$S2x=(L/Q) \times N2x+Sx$$

$$S2y=(L/Q) \times N2y+Sy$$

Connecting these points N, S1 and S2 together with straight lines yields the isosceles triangle Tr in which the length of the base is 2L and the apex is the point N, with the start point S being at the midpoint along the base.

In step 74, a shape other than an isosceles triangle may be rendered. Any other suitable shape may be used as long as it indicates both the direction and the distance between the start point S and the point N, e.g., a line connecting between the start point S and the point N or an arrow extending from the start point S to the point N.

Referring back to FIG. 14, if there is no longer an input from the touch panel 13 (i.e., if the touch operation to the touch panel 13 by the player is finished) in step 58, the process proceeds to step 59. Steps 59 and 60 in FIG. 14 are similar to steps 29 and 30 of FIG. 5 in the first embodiment, and will not be further described below. Through steps 56 and 59, at least two parameters (the coordinate positions at the input start point and the input end point) are extracted from the change in the input to the touch panel 13. In the present embodiment, a total of three parameters are used, including the continuous input time data (input detection time) detected in step 60. Also in the present embodiment, the types and number of parameters to be used can be determined based on the intended action of the player object (the cue ball P1 in the present embodiment) on the first display screen 11a.

Then, based on the stored parameters, the CPU 21 calculates the change condition data such as the movement step (movement direction), the velocity and the shot mode of the cue ball P1 in the first game image on the first display screen 11a (step 61). Specifically, the CPU 21 calculates the movement step (movement direction) and the velocity of the cue ball P1 based on three parameters: the coordinate position data at the input start point (i.e., the start point) obtained in step 56; the coordinate position data at the input end point (i.e., the end point) obtained in step 59; and the continuous input time data between the start point and the end point obtained in step 60. The change condition data calculation operation will now be described in detail with reference to FIG. 16.

Referring to FIG. 16, the CPU 21 calculates the difference between the end point E (x2, y2) and the start point S (x1, y1), i.e., Δx=x2−x1 and Δy=y2−y1 (step 81). The CPU 21 has obtained the continuous input time t1 in step 60. Then, the CPU 21 determines whether or not the continuous input time t1 is zero or the differences Δx and Δy are both zero (step 82). If the continuous input time t1 is zero or Δx and Δy are both zero, the CPU 21 turns OFF the movement flag (step 83), and the process exits the subroutine. If t1 is greater than zero and if at least one of Δx and Δy is not zero, the process proceeds to step 84.

In step 84, the CPU 21 detects the shot mode using the coordinate position data of the start point S and the end point E. The shot mode detection operation will now be described in detail with reference to FIG. 17.

Referring to FIG. 17, the CPU 21 calculates a straight line SE passing through the end point E and the start point S (step 101). The straight line SE passing through the start point S (x1, y1) and the end point E (x2, y2) can be obtained as follows.

$$y = \frac{y2-y1}{x2-x1}(x-x1) + y1$$

Then, the CPU 21 calculates two intersection points Q1 and Q2 between the straight line SE and a circle coincident with the circumference of the operated cue ball P2 (step 102). The circle coincident with the circumference of the operated cue ball P2 is expressed as follows:

$$x^2 + y^2 = r$$

where r is the radius of the circle. The x coordinates of the intersection points between the straight line SE and the circle can be obtained as follows.

$$x = \frac{-2AB \pm \sqrt{4A^2B^2 - 4(A^2+1)(B^2-r^2)}}{2(A^2+1)}$$

In this expression, A=(y2−y1)/(x2−x1) and B=y1−A*x1. The y coordinates of the two intersection points Q1 and Q2 can be obtained by substituting the obtained x coordinates into the expression of the straight line SE. The intersection point Q2 is one of the two intersection points that is closer to the end point E (x2, y2).

Then, the CPU 21 calculates the angles of straight lines connecting between the center of the circle and the two intersection points Q1 and Q2 (step 103). The angles can be obtained by substituting the x and y coordinates of the two intersection points obtained in step 102 into atan (y/x). Where x=0, the angle is set to 90° or 270°. Where x1=x2, the angles are obtained by atan (y2/x2) and atan (y1/x1) in step 103, and where x1=0 or x2=0, the angle is set to 90° or 270°.

Then, the CPU 21 calculates the difference between the angles obtained in step 103 (step 104). Specifically, the angle corresponding to the intersection point Q1 is subtracted from the angle corresponding to the intersection point Q2. If the subtraction result is a positive value, the subtraction result is used as it is as the angular difference. If the subtraction result is a negative value, the angular difference is obtained by adding 360° to the subtraction result.

If the absolute value of the angular difference is less than or equal to 135° (i.e., Yes in step 105), the CPU 21 sets the shot mode to "left curve" and turns ON the left curve flag (step 106), and the process exits the subroutine. If the absolute value of the angular difference is equal to or greater than 225° (i.e., Yes in step 107), the CPU 21 sets the shot mode to "right curve" and turns ON the right curve flag (step 108), and the CPU 21 exits subroutine. In other words, in step 105, the CPU 21 determines whether or not the start point S of the continuous input is located in the defined region Z3 of the operated cue ball P2 (see FIG. 10). In step 107, the CPU 21 determines whether or not the start point S of the continuous input is located in the defined region Z4 of the operated cue ball P2 (see FIG. 11).

If the absolute value of the angular difference is greater than 135° and less than 225° (i.e., No in both steps 105 and 107), the CPU 21 calculates a perpendicular line to the straight line SE that passes through the center of the circle (step 109). Then, the CPU 21 calculates the positions of the start point S and the end point E with respect to the perpendicular line obtained in step 109 (step 110). If the start point S and the end point E are both located closer to the defined region Z1 with respect to the perpendicular line (see FIG. 8) (i.e., Yes in step 111), the CPU 21 sets the shot mode to "follow" and turns ON the follow flag (step 112), and the process exits the subroutine. If the start point S and the end point E are both located closer to the defined region Z2 with respect to the perpendicular line (i.e. Yes in step 113), the CPU 21 sets the shot mode to "draw" and turns ON the draw flag (step 114), and the process exits the subroutine. If the start point S and the end point E are located in different regions with respect to the perpendicular line (specifically, if the start point S is located in the defined region Z2 and the end point E is located in the defined region Z1) (i.e., No in both steps 111 and 113), the CPU 21 sets the shot mode to "center ball" and turns ON the center ball flag (step 115), and the process exits the subroutine. In other words, if the decision result is Yes in step 111, the CPU 21 determines that the start point S of the continuous input is located in the defined region Z1 of the operated cue ball P2 (see FIG. 13). If the decision result is Yes in step 113, the CPU 21 determines that the start point S and the end point E of the continuous input are both located in the defined region Z2 of the operated cue ball P2 (see FIG. 12). If the decision result is No in step 113, the CPU 21 determines that the start point S of the continuous input is located in the defined region Z2 of the operated cue ball P2 while the end point E is located in the defined region Z1 (see FIG. 9).

The perpendicular line to the straight line SE passing through the center of the circle, which is calculated in step 109, is obtained as follows.

$$y=-\{(x2-x1)/(y2-y1)\}x$$

The CPU 21 can perform the decision operations in steps 111 and 113 based on the sign of two values C1 and C2, which are calculated as follows.

$$C1=y1+\{(x2-x1)/(y2-y1)\}x1$$

$$C2=y2+\{(x2-x1)/(y2-y1)\}x2$$

In step 111, if the values C1 and C2 are both positive, the CPU 21 determines that the start point S and the end point E are both closer to the defined region Z1 with respect to the perpendicular line. In step 113, if the values C1 and C2 are both negative, the CPU 21 determines that the start point S and the end point E are both located closer to the defined region Z2 with respect to the perpendicular line.

Referring back to FIG. 16, after detecting the shot mode in step 84, the CPU 21 compares the absolute values of the differences Δx and Δy calculated in step 81 with each other to determine if |Δx|>|Δy| holds true (step 85). If |Δx|>|Δy| holds true, the CPU 21 calculates the movement steps (movement directions) gStepX and gStepY per unit time with respect to the x axis direction (step 86), and the process proceeds to step 88. Specifically, in step 86, if the difference Δx is a positive value, the movement step gStepX in the x axis direction is set to 1.0. If the difference Δx is a negative value, the movement step gStepX is set to −1.0. The movement step in the y axis direction is calculated as gStepY=Δy/|Δx|.

If |Δx|≦51 Δy| holds true, the CPU 21 calculates the movement steps (movement directions) gStepX and gStepY per unit time with respect to the y axis direction (step 87), and the process proceeds to step 88. Specifically, in step 87, if the difference Δy is a positive value, the movement step gStepY in the y axis direction is set to 1.0. If the difference Δy is a negative value, the movement step gStepY is set to −1.0. The movement step in the x axis direction is calculated as gStepX=Δx/|Δy|.

Instep 88, the CPU 21 turns ON the movement flag. Then, the CPU 21 calculates the velocity of the cue ball P1 based on the distance between the start point S and the end point E and the continuous input time t1 (step 89). The distance Lse between the start point S and the end point E is obtained as follows.

$$Lse=\sqrt{\Delta x^2+\Delta y^2}$$

While the velocity of the cue ball P1 is calculated so that it is higher as the continuous input time t1 is shorter, the influence of the continuous input time t1 is reduced herein. For example, a value 11a being a square root of a value obtained by dividing the continuous input time t1 by a constant (e.g., 16) is used. Then, the velocity gSpeed of the cue ball P1 is obtained as follows.

$$gSpeed=Lse/t1a+Sp1$$

In this expression, Sp1 is the minimum velocity constant (e.g., 16). If the calculated velocity gSpeed exceeds a predetermined maximum velocity, the velocity gSpeed is set to the maximum velocity. Therefore, the initial value of the velocity gSpeed of the cue ball is set to be between the minimum velocity and the maximum velocity according to the touch operation by the player.

The movement steps gStepX and gStepY calculated in step 86 or step 87 and the velocity gSpeed calculated in step 89 may be adjusted according to the intended action of the cue ball P1 on the first display screen 11a. For example, the action of the cue ball P1 to be rendered on the first display screen 11a can be adjusted by multiplying the velocity gSpeed by a constant (e.g., 88) or dividing the movement steps gStepX and gStepY by a constant (e.g., 16).

Then, the CPU 21 determines whether or not one of the left curve flag and the right curve flag (hereinafter referred to collectively as the "curve flag") is ON (step 90). If the curve flag is OFF, the process exits the subroutine. If the curve flag is ON, the CPU 21 sets a curve coefficient k (step 91), and the process exits the subroutine. The curve coefficient k represents an angle by which the cue ball P1 is curved, and the absolute value thereof is set to be larger as the straight line (straight line SE) between the start point S and the end point E is farther away from the center of the operated cue ball P2. For example, the curve coefficient k is set so that the angle by which the cue ball P2 is curved in the operation of moving the display position of the cue ball P1 to be described later is about 2° to about 7°. Specifically, the curve coefficient k is determined by using the angle calculated in step 103. For example, if the shot mode is "left curve", the curve coefficient k is set to (α−67)/24−4.5, where α is the angle calculated in step 103. If the shot mode is "right curve", the curve coefficient k is set to (α−292)/24+4.5. With these expressions, the curve coefficient k is set to a negative value for "left curve" and to a positive value for "right curve". These expressions for calculating the curve coefficient k may also be adjusted according to the intended action of the cue ball P1 on the first display screen 11a.

Referring back to FIG. 14, based on the change condition data such as the movement step and the velocity calculated in the change condition data calculation operation of step 61, the CPU 21 updates the display position of the cue ball P1, thereby rendering the rolling of the cue ball P1 on the first display screen 11a (step 62). The cue ball display position updating operation will now be described in detail with reference to FIG. 18.

In FIG. 18, the CPU 21 determines whether or not the movement flag is ON (step 120). If the movement flag is ON, the process proceeds to step 121, and if the movement flag is OFF, the process exits the subroutine.

In step 121, the CPU 21 sets a loop counter LC for counting the number of loop iterations for determining the movement step per unit time, the movement direction, etc., of the cue ball P1 to a value according to the current velocity gSpeed. For example, the loop counter LC is set to a value calculated as gSpeed/128+1 (dropping fractions below decimal point), whereby the loop counter LC is set to 1 or more according to the velocity gSpeed. The value of the loop counter LC may also be adjusted according to the intended action of the cue ball P1 on the first display screen 11a.

Then, the CPU 21 adds the current movement steps gStepX and gStepY to the current x and y coordinate values of the display position of the cue ball P1, respectively (step 122). Then, based on the display position (the x and y coordinates) of the cue ball P1 to which gStepX and gStepY have been added in step 122, the CPU 21 performs an operation of handling a contact of the cue ball P1 with another object (step 123). The cue ball contact operation will now be described in detail with reference to FIG. 19.

Referring to FIG. 19, the CPU 21 determines whether or not the cue ball P1 contacts a rail of the billiard table D based on the display position (the x and y coordinates) of the cue ball P1 to which gStepX and gStepY have been added in step 122 (step 141). Then, if it is determined that the cue ball P1 contacts a rail of the billiard table D, the CPU 21 determines whether or not the contacted rail is the upper or lower rail in the first display screen 11a (step 142). If the contacted rail is not the upper or lower rail of the billiard table D (i.e., if the contacted rail is the left or right rail), the CPU 21 inverts the sign of the current movement step gStepX, and the process proceeds to step 145. If the contacted rail is the upper or lower rail of the billiard table D, the CPU 21 inverts the sign of the current movement step gStepY, and the process proceeds to step 145.

In step 145, the CPU 21 decreases the velocity gSpeed of the cue ball P1 based on a predetermined deceleration rate set for a contact with a rail. For example, the velocity gSpeed is decreased by multiplying the current velocity gSpeed by ⅞. Then, the process proceeds to step 149.

If it is determined in step 141 that the cue ball P1 does not contact a rail of the billiard table D, the CPU 21 determines whether or not the cue ball P1 falls into a pocket of the billiard table D (step 146). If the cue ball P1 falls into a pocket, the CPU 21 sets the velocity gSpeed to zero and performs a pocket-in process (step 147), after which the CPU 21 turns OFF the movement flag (step 148), and the process exits the subroutine. If the cue ball P1 does not fall into a pocket, the process proceeds to step 149.

In step 149, based on the display position (the x and y coordinates) of the cue ball P1 to which gStepX and gStepY have been added in step 122, it is determined whether or not the cue ball P1 contacts another object ball T. If the cue ball P1 contacts another object ball T, the process proceeds to step 150. If the cue ball P1 does not contact another object ball T, the process exits the subroutine.

In step 150, the CPU 21 detects the conditions under which the cue ball P1 contacts the object ball T. The contact conditions include the movement direction and the movement velocity (movement vector) of each of the cue ball P1 and the contacted object ball T, as well as the angle and the point at which the cue ball P1 contacts the object ball T. Then, based on the contact conditions detected in step 150, the CPU 21 updates the movement steps gStepX and gStepY of the cue ball P1 (step 151). For example, the movement steps gStepX and gStepY are updated by using the result of adding together the movement vector of the cue ball P1 and that of the object ball T. Moreover, depending on the positions of the cue ball P1 and the object ball T, the signs of the movement steps gStepX and gStepY are inverted. The movement steps gStepX and gStepY are updated based on the contact conditions as described above. This process will not be further described herein.

Then, based on the contact conditions detected in step 150, the CPU 21 updates the velocity gSpeed of the cue ball P1 (step 152). For example, the velocity gSpeed is updated to zero if the cue ball P1 collides head to head with the object ball T with the center of the object ball T being aligned with the movement direction of the cue ball P1. Otherwise, the deceleration on the velocity gSpeed is decreased as the center of the object ball T is more shifted from the movement direction of the cue ball P1. In the present embodiment, if the cue ball P1 contacts a standing object ball T, the velocity gSpeed of the cue ball P1 is decreased by at least 50%. If the movement velocity of the contacted object ball T is higher than the movement velocity of the cue ball P1, the velocity gSpeed of the cue ball P1 may be increased. The velocity gSpeed is updated based on the contact conditions as described above. This process will not be further described herein.

Then, the CPU 21 calculates the movement step and the velocity for the object ball T contacted by the cue ball P1 (step 153). The movement step and the velocity of the object ball T are set and updated based on the contact conditions as described above, as with the cue ball P1. This process will not be further described herein.

Then, the CPU 21 determines whether or not the shot mode of the cue ball P1 is "follow" or "draw" (step 154). Specifically, the CPU 21 makes the determination based on the follow flag, which is turned ON in step 112, and the draw flag, which is turned ON in step 114. If the shot mode of the cue ball P1 is "follow" or "draw", the CPU 21 sets a curve coefficient k according to the shot mode (step 155), and the process exits the subroutine. If the shot mode of the cue ball P1 is neither "follow" nor "draw", the process directly exits the subroutine. If the shot mode is "follow", the curve coefficient k is set in step 155 so that the split angle from the object ball T is smaller than that in other shot modes (e.g., the cue ball P1 follows the object ball T that it has just hit) in the operation of moving the display position of the cue ball P1 to be described later. If the shot mode is "draw", the curve coefficient k is set so that the split angle from the object ball T is larger than that in other shot modes (e.g., the cue ball is pulled back away from the object ball T that it has just hit) in the operation of moving the display position of the cue ball P1. In the present embodiment, the curve coefficient k is set to +3° if the shot mode is "follow", and to −3° if the shot mode is "draw". The values of the curve coefficient k are not limited to the fixed values mentioned above. The curve coefficient k may be adjusted according to the intended action of the cue ball P1 on the first display screen 11a, and the value thereof may be varied depending on the contact conditions, for example.

Referring back to FIG. 18, after the cue ball contact operation in step 123, the CPU 21 determines whether or not the cue ball P1 contacts another object (step 124) based on the display position (the x and y coordinates) of the cue ball P1 to which gStepX and gStepY have been added in step 122. The contact between the cue ball P1 and another object can be determined based on the operation result from step 123, and if the cue ball P1 does not contact another object (i.e., No in all of steps 141, 146 and 149), the CPU 21 decrements the value of the loop counter LC by 1 (step 125). Then, the CPU 21 determines whether or not the value of the loop counter LC is zero (step 126). If the value of the loop counter LC is not zero, the CPU 21 returns to step 122 to repeat the operation.

If the value of the loop counter LC is zero, the CPU 21 specifies the current x and y coordinates of the display position of the cue ball P1 as the display position of the cue ball P1 in the first game image and displays the cue ball P1 on the first display screen 11a (step 127), and the process proceeds to step 128. Step 127 is an operation that is repeated by the CPU 21 at regular intervals, and the display position of the cue ball P1 in the first game image is updated at regular intervals. The display position of the cue ball P1 is updated as movement steps gStepX and gStepY are added to the current x and y coordinates of the cue ball P1 in step 122 and the addition process is repeated a number of times equal to the initial value of the loop counter LC. Thus, the cue ball P1 is displayed in the first game image while being moved to a new display position at regular intervals, the new display position being calculated by adding the movement steps gStepX and gStepY to the x and y coordinates of the cue ball P1 a number of times equal to the initial value of the loop counter LC. Since the initial value of the loop counter LC is determined according to the velocity gSpeed, the cue ball P1 is displayed in the first game image while being moved according to the movement steps gStepX and gStepY and the velocity gSpeed at regular intervals.

If it is determined in step 124 that the cue ball P1 contacts another object (i.e., Yes in step 141, 146 or 149), the CPU 21 specifies the current x and y coordinates of the display position of the cue ball P1 as the display position of the cue ball P1 in the first game image and displays the cue ball P1 on the first display screen 11a (step 136), and returns to step 120 to repeat the operation. The operation of step 136 is similar to that of step 127, and will not be further described below.

After displaying the cue ball P1 in the first game image in step 127, the CPU 21 determines whether or not the velocity gSpeed is high (step 128) and whether or not the velocity gSpeed is medium (step 129). Steps 128 and 129 are an operation in which the CPU 21 determines whether the current velocity gSpeed of the cue ball P1 is high, medium or low. For example, a high speed is defined as gSpeed$\geq$512, a medium speed as 512>gSpeed$\geq$256, and a low speed as 256>gSpeed.

If it is determined that the velocity gSpeed is high (i.e., Yes in step 128), the CPU 21 decreases the current velocity gSpeed based on a coefficient of friction to set a new velocity gSpeed (step 130), and the process proceeds to step 133. Specifically, in step 130, a value obtained by dividing the velocity gSpeed by a predetermined friction constant (e.g., 28) is subtracted from the velocity gSpeed. If it is determined that the velocity gSpeed is medium (i.e., Yes in step 129), the CPU 21 subtracts a constant b (e.g., b=16) from the current velocity gSpeed to set a new velocity gSpeed (step 131), and the process proceeds to step 133. If it is determined that the velocity gSpeed is low i.e., (No in steps 128 and 129), the CPU 21 subtracts a constant c(b>c; e.g., c=7) from the current velocity gSpeed to obtain a new velocity gSpeed (step 132), and the process proceeds to step 133. The classification of the velocity gSpeed and the deceleration value may be adjusted according to the intended action of the cue ball P1 on the first display screen 11a. For example, the number of classes of the velocity gSpeed may be increased while setting a deceleration value for each of the velocity classes.

In step 133, the CPU 21 determines whether or not gSpeed$\leq$0 holds true. If gSpeed$\leq$0 holds true, the CPU 21 turns OFF the movement flag (step 135), and the process exits the subroutine. If gSpeed>0, the CPU 21 updates the movement steps gStepX and gStepY (step 134), and returns to step 120 to repeat the operation. Thus, the cue ball display position updating operation is repeated until the velocity gSpeed is less than or equal to zero. The operation of updating the movement steps gStepX and gStepY will now be described in detail with reference to FIG. 20.

Referring to FIG. 20, the CPU 21 determines whether or not the center ball flag, as an indicator of the shot mode of the cue ball P1, is ON (step 161), whether or not the follow flag or the draw flag is ON (step 162), and whether or not the curve flag is ON (step 163). If the center ball flag is ON (i.e., Yes in step 161), the process proceeds to step 166. If the follow flag or the draw flag is ON (i.e., Yes in step 162), the CPU 21 determines whether or not a curve coefficient k according to the flag being ON has been set (step 164). If it is determined that a curve coefficient k according to the flag being ON has not been set (i.e., No in step 164), the process proceeds to step 166. Otherwise (i.e., Yes in step 164), the process proceeds to step 165. If it is determined that the curve flag is ON (i.e., Yes in step 163), the process proceeds to step 165. If it is determined that none of the flags is ON (i.e., No in all of steps 161 to 163), the process proceeds to step 166.

In step 165, the CPU 21 decreases the absolute value of the curve coefficient k by a predetermined amount, and the process proceeds to step 166. For example, where a curve coefficient k according to the curve flag being ON has been set, the CPU 21 decreases the absolute value of the curve coefficient k by 0.1. If a curve coefficient k according to the follow flag or the draw flag being ON has been set, the CPU 21 decreases the absolute value of the curve coefficient k by 0.2. The amount by which the curve coefficient k is decreased may be adjusted according to the intended action of the cue ball P1 on the first display screen 11a.

In step 166, the CPU 21 updates the movement steps gStepX and gStepY based on the curve coefficient k, and the process exits the subroutine. If the curve coefficient k has not been set, the curve coefficient k is set to zero. Specifically, the CPU 21 updates the movement steps gStepX and gStepY based on the following expressions.

$gStepX = \cos k * gStepX - \sin k * gStepY$ $gStepY = \sin k * gStepX + \cos k * gStepY$ In these expressions, gStepX and gStepY on the left side are the updated movement steps gStepX and gStepY. Moreover, gStepX and gStepY on the right side are the movement steps gStepX and gStepY before being updated. The point represented by the updated movement steps gStepX and gStepY is a point obtained by rotating a point represented by the movement steps gStepX and gStepY before being updated about the origin by an angle of k. Since the movement steps gStepX and gStepY are parameters by which the cue ball P1 is moved per unit time as described above, the cue ball P1 being curved by the angle k can be rendered in the first game image by updating the movement steps gStepX and gStepY in step 166.

Referring back to FIG. 14, after the cue ball display position updating operation in step 62, the CPU 21 determines whether or not to end the game (step 63). The CPU 21 repeatedly performs steps 54 to 62 until the game ends.

Thus, in addition to the advantageous effects of the first embodiment, the second embodiment provides an advantageous effect that a change in the input given to the graphic pattern to be operated, i.e., the input pattern given through a touch operation on the touch panel 13, is visualized in the form of a shape (the isosceles triangle Tr), thus continuously showing the current input status to the player. Moreover, in the second embodiment, the character pattern (the operated cue ball P2) corresponding to the player character (the cue ball P1) displayed on the first display screen 11*a* is divided into regions so as to increase the variety of patterns in which the appearance of the player character is changed, thus enhancing the game playability. Generally, if the character pattern to be operated through a touch operation is divided into smaller regions for that reason, each region to be operated through a touch operation may become too small for the player to perform an intended operation. In the second embodiment, however, the character pattern is displayed on the second display screen 12*a* on a larger scale than the player character, whereby even if the character pattern is divided into smaller regions, the player can relatively accurately specify an intended position. Moreover, the character pattern is divided based on the direction in which the player character is to be moved so that the player can predict how the appearance of the player character will change, whereby the player can intuitively predict how the player character will change as a result of the touch operation. Moreover, the touch operation to be performed by the player is to simply input the start point and the end point on the character pattern displayed on the second display screen 12*a*, whereby it is possible to prevent the complexity/difficulty level of the gameplay from becoming excessively high, and various movements of the player object can be realized with simple operations.

In the second embodiment, the shot mode is determined based basically on the position of the start point S (the position of the end point E is taken into consideration for the distinction between "center ball" and "draw"; see FIG. 9 to FIG. 13). In other embodiments, the shot mode may be determined based on the position of the end point E. The shot mode can be determined based basically on the position of the end point E as follows. For example, the shot mode may be set to "left curve" if the end point E is located in the defined region Z3, "right curve" if the end point E is located in the defined region Z4, "draw" if the end point E is located in the defined region Z2, "center ball" if the end point E is located in the defined region Z1, and "follow" if the start point S and the end point E are both located in the defined region Z1.

Figure 22:
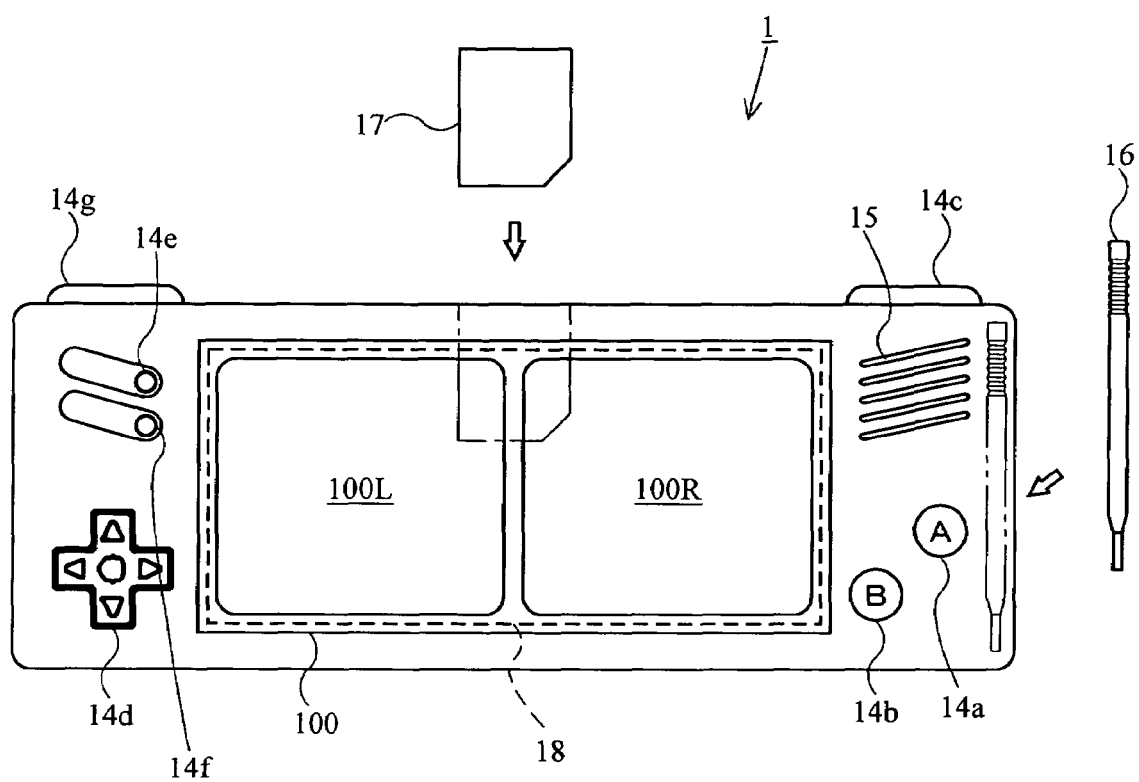
FIG. 22 generally shows the video game device 1 according to an alternative embodiment.

The first and second embodiments are directed to the video game device 1 in which the first game image and the second game image are displayed on physically separate two display devices, i.e., on the first display screen 11*a* of the first LCD 11 and on the second display screen 12*a* of the second LCD 12, as shown in FIG. 1. However, the present invention is not limited to a video game program to be executed by such a video game device. For example, a video game device may include a single display device whose display screen is divided into two sections. FIG. 22 shows an example of such a video game device including a single display device. Like elements to those of the embodiments above are denoted by like reference numerals, and will not be further described below.

Referring to FIG. 22, the video game device 1 includes a single LCD 100 instead of the first LCD 11 and the second LCD 12. The screen of the LCD 100 is entirely covered by a touch panel 18. The screen of the LCD 100 is divided by a video game program or a monitor program into at least two display screens, i.e., a first display screen 100L and a second display screen 100R. The computer of the video game device 1 detects a change in the input to the graphic pattern, which is a region of the touch panel 18 corresponding to the second display screen 100R and which is displayed on the second display screen 100R, and performs similar operations to those of the first and second embodiments described above. Thus, the game image, etc., on the first display screen 100L or the second display screen 100R is changed. Alternatively, a vertically-oriented LCD may be divided into upper and lower display screens (i.e., a single LCD having a vertical display area sufficient to accommodate two screens may be used) to realize the video game device 1. Thus, the first and second game images may be displayed on two screens that are obtained by dividing a single screen in two. With these alternative embodiments, the present invention can be applied to conventional video game devices, or the like, whose display device has a touch panel.

While the example embodiment presented herein has been described in detail, the foregoing description is in all aspects illustrative and not restrictive. It is understood that numerous other modifications and variations can be devised without departing from the scope of the invention.

What is claimed is:

1. A recording medium storing a video game program executed by a computer of a video game device including a first display screen and a second display screen covered by a touch panel, wherein the video game program makes the computer to function as:

first game image display control programmed logic circuitry for displaying, on the first display screen, a first game image including a player character which is movable in the first display screen in accordance with an operation performed by a player;

second game image display control programmed logic circuitry for displaying a second game image on the second display screen in which a character pattern corresponding to the player character in the first game image is displayed on a larger scale than the player character in the first game image and in a fixed manner in the second display screen;

input detection programmed logic circuitry for detecting an input position and an input change specified through a touch operation on the touch panel;

change condition calculation programmed logic circuitry for, when at least a portion of the input position detected by the input detection programmed logic circuitry is on the character pattern displayed on the second display screen, calculating change condition data used for changing an appearance of the player character according to the input position on the character pattern and the input change detected by the input detection programmed logic circuitry; and player character control programmed logic circuitry for changing the appearance of the player character based on the change condition data.

2. The recording medium storing a video game program according to claim 1, wherein the change condition calculation programmed logic circuitry divides a detection region of the touch panel corresponding to the character pattern displayed on the second display screen into a plurality of defined regions, and calculates an action parameter as the change condition data, wherein the action parameter is calculated based on which defined region includes the input position on the character pattern.

3. The recording medium storing a video game program according to claim 1, wherein:

the player character is a moving object that moves in a game space;

the change condition calculation programmed logic circuitry calculates, as the change condition data, initial movement condition data used for determining an initial movement direction of the moving object in the game space, based on a direction of the input change; and the change condition calculation programmed logic circuitry calculates, as the change condition data, movement transition condition data used for changing a movement direction of the moving object in the game space after the movement of the moving object in the initial movement direction has been started, based on the input position on the character pattern.

4. The recording medium storing a video game program according to claim 1, wherein:

the input detection programmed logic circuitry determines whether or not there is an input to the touch panel at regular intervals, and detects the input position and the input change by detecting coordinate positions on the touch panel while the input is being detected continuously; and the change condition calculation programmed logic circuitry extracts coordinate positions at an input start point and an input end point from the input to the touch panel continuously detected by the input detection programmed logic circuitry, and calculates the change condition data according to the coordinate positions at the input start point and the input end point.

5. The recording medium storing a video game program according to claim 4, wherein:

the player character is a moving object that moves in a game space;

the change condition calculation programmed logic circuitry calculates, as the change condition data, initial movement condition data used for determining an initial movement direction and a velocity of the moving object in the game space, based on a direction from the coordinate position at the input start point to the coordinate position at the input end point; and the change condition calculation programmed logic circuitry divides a detection region of the touch panel corresponding to the character pattern displayed on the second display screen into a plurality of defined regions, and calculates, as the change condition data, movement transition condition data used for changing a movement direction of the moving object in the game space after the movement of the moving object in the initial movement direction has been started, wherein the movement transition condition data is calculated based on which defined region includes at least one of the coordinate positions on the character pattern at the input start point and the input end point.

6. The recording medium storing a video game program according to claim 5, wherein the change condition calculation programmed logic circuitry divides the detection region of the touch panel corresponding to the character pattern displayed on the second display screen into a plurality of defined regions according to a direction from the coordinate position at the input start point to the coordinate position at the input end point.

7. The recording medium storing a video game program according to claim 5, wherein the change condition calculation programmed logic circuitry calculates the movement transition condition data so that an amount by which a movement direction of the moving object is changed is larger as a distance between a predetermined reference position and a straight line including the coordinate position at the input start point and the coordinate position at the input end point is larger, the predetermined reference position being included in the detection region of the touch panel corresponding to the character pattern displayed on the second display screen.

8. The recording medium storing a video game program according to claim 1, wherein the input detection programmed logic circuitry determines whether or not there is an input to the touch panel at regular intervals, and detects the input position and the input change by detecting coordinate positions on the touch panel while the input is being detected continuously;

the video game program makes the computer to further function as a timer for clocking an input detection time being an amount of time for which an input is continuously detected by the input detection programmed logic circuitry; and the change condition calculation programmed logic circuitry extracts coordinate positions at an input start point and an input end point from the input to the touch panel continuously detected by the input detection programmed logic circuitry, and calculates the change condition data according to at least two of the coordinate position at the input start point, the coordinate position at the input end point and the input detection time.

9. The recording medium storing a video game program according to claim 1, wherein the input detection programmed logic circuitry determines whether or not there is an input to the touch panel at regular intervals, and detects the input position and the input change by detecting coordinate positions on the touch panel while the input is being detected continuously;

the video game program makes the computer to further function as shape producing programmed logic circuitry for, while an input is continuously detected by the input detection programmed logic circuitry, producing a single shape representing a relationship between a current input coordinate position on the touch panel and the coordinate position at the input start point;

the second game image display control programmed logic circuitry displays, on the second display screen, the second game image further including the shape produced by the shape producing programmed logic circuitry.

10. The recording medium storing a video game program according to claim 9, wherein the shape produced by the shape producing programmed logic circuitry is an isosceles triangle in which the current input coordinate position is an apex, and the coordinate position at the input start point is at a midpoint along a base having a predetermined length.

11. A video game device, comprising:

storage locations for storing the video game program according to claim 1;

a first display screen;

a second display screen covered by a touch panel; and game execution programmed logic circuitry for executing the video game program stored in the storage locations.

* * * * *